US012756791B2

(12) United States Patent
Isokawa

(10) Patent No.: US 12,756,791 B2
(45) Date of Patent: Oct. 6, 2026

(54) IMAGE READING APPARATUS WITH IMAGE SENSORS AND COLOR MEASURER

(71) Applicant: Konica Minolta, Inc., Tokyo (JP)

(72) Inventor: Hiroshi Isokawa, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 118 days.

(21) Appl. No.: 18/625,889

(22) Filed: Apr. 3, 2024

(65) Prior Publication Data

US 2024/0251054 A1 Jul. 25, 2024

Related U.S. Application Data

(63) Continuation of application No. 17/540,716, filed on Dec. 2, 2021, now Pat. No. 11,985,289, which is a (Continued)

(30) Foreign Application Priority Data

Apr. 2, 2020 (JP) ................................. 2020-066507

(51) Int. Cl.

| | |
|---|---|
| ***H04N 1/60*** | (2006.01) |
| *H04N 1/00* | (2006.01) |
| *H04N 1/03* | (2006.01) |

(52) U.S. Cl.

CPC ......... *H04N 1/6041* (2013.01); *H04N 1/6036* (2013.01); *H04N 1/6044* (2013.01); (Continued)

(58) Field of Classification Search

CPC .. H04N 1/6041; H04N 1/6033; H04N 1/6036; H04N 1/6044

See application file for complete search history.

(56) References Cited

U.S. PATENT DOCUMENTS

| | | | | |
|---|---|---|---|---|
| 7,271,380 | B2 | 9/2007 | Banton et al. | |
| 8,150,283 | B2 | 4/2012 | Hosier | |
| 10,701,245 | B2 | 6/2020 | Yoshizawa | |
| 11,831,849 | B2 * | 11/2023 | Morimoto .......... | H04N 1/00015 |
| 2016/0156810 | A1 | 6/2016 | Nakamura | |

(Continued)

FOREIGN PATENT DOCUMENTS

| | | | |
|---|---|---|---|
| EP | 2622836 | B1 | 7/2015 |
| JP | 2008017431 | A | 1/2008 |

(Continued)

OTHER PUBLICATIONS

Japanese Patent Office, Notice of Reasons for Refusal mailed Apr. 2, 2024 for the corresponding Japanese patent application No. 2022-190239, with English translation, 33 pages.

(Continued)

*Primary Examiner* — Abderrahim Merouan

(74) *Attorney, Agent, or Firm* — LUCAS & MERCANTI, LLP

(57) ABSTRACT

An image forming apparatus performs the following. An imaging range imaged by each of the plurality of imaging sensors includes an overlapping portion between the imaging sensors adjacent in a width direction orthogonal to a conveying direction along the conveying path. A hardware processor performs a calibration operation of a first sensor based on a color measuring result of a predetermined inspection image measured within a standard imaging range of the first sensor among the plurality of imaging sensors, and a standard imaging result within the standard imaging range imaging an inspection image with a same pattern as the inspection image. The hardware processor compares imaging results by the plurality of imaging sensors in the overlapping portions and performs the calibration operation of another sensor different from the first sensor using the standard imaging result as a standard.

11 Claims, 12 Drawing Sheets

Related U.S. Application Data continuation of application No. 17/201,545, filed on Mar. 15, 2021, now Pat. No. 11,223,747.

(52) U.S. Cl.
CPC ..... *H04N 1/00023* (2013.01); *H04N 1/00034* (2013.01); *H04N 1/00087* (2013.01); *H04N 1/03* (2013.01)

(56) References Cited

U.S. PATENT DOCUMENTS

| | | | |
|---|---|---|---|
| 2017/0359489 | A1 | 12/2017 | Lopez |
| 2023/0056391 | A1 | 2/2023 | Olivera Corpas et al. |

FOREIGN PATENT DOCUMENTS

| | | | | | |
|---|---|---|---|---|---|
| JP | 2012-004868 | A | | 1/2012 | |
| JP | 2012005066 | A | | 1/2012 | |
| JP | 5163193 | B2 | * | 3/2013 | ........... G06F 3/1208 |
| JP | 2014-151462 | A | | 8/2014 | |
| JP | 2015226128 | A | | 12/2015 | |
| JP | 2016-104544 | A | | 6/2016 | |

OTHER PUBLICATIONS

Office Action/Search Report dated Feb. 28, 2023, for corresponding Japanese Application No. 2022-190239, with English translation.

Office Action/Search Report dated Jan. 17, 2023, for corresponding Japanese Application No. 2022-190239, with English translation.

Notice of Reasons for Refusal, dated Jun. 25, 2024, issued for corresponding Japanese Patent Application No. 2024-019159, with English Translation.

Decision of Refusal dated Oct. 29, 2024, issued for the corresponding Japanese Patent Application No. 2024-019159, 6 pages, with English translation.

* cited by examiner

IMAGE READING APPARATUS WITH IMAGE SENSORS AND COLOR MEASURER

CROSS-REFERENCE TO RELATED APPLICATIONS

This is a continuation application of U.S. application Ser. No. 17/540,716 filed on Dec. 2, 2021, which is a continuation of U.S. application Ser. No. 17/201,545 filed on Mar. 15, 2021, now U.S. Pat. No. 11,223,747 issued Jan. 11, 2022, which claims priority of Japanese Patent Application No 2020-066507 filed on Apr. 2, 2020, all of which are incorporated herein by reference in its entirety.

BACKGROUND

Technological Field

The present invention relates to an image forming apparatus, an image reading apparatus, and a calibration method.

Description of the Related Art

Regarding image forming apparatuses which form images on media, there is a demand for high quality when used for commercial purposes. Therefore, there is a necessity for highly accurate calibration and quick detection of abnormalities. In view of the above, there is a technique to image the formed image in order to detect unevenness in density and poor image quality. Imaging is performed using an imaging sensor in which a plurality of imaging elements are aligned throughout a width orthogonal to a conveying direction of a medium. The plurality of imaging elements are positioned to be in a direction intersecting with a conveying direction of the medium and are placed in a surface parallel to the conveying direction. With this, a two-dimensional image is obtained.

In such image forming apparatus, when a single imaging sensor is made longer to match the size of an image to be formed, there are problems such as the cost increasing and the yield when manufactured decreasing. In view of the above, there is a technique to align a plurality of imaging sensors and imaging in parallel so that the total width of the medium is imaged as a whole (JP 2012-4868). In this case, adjustment is made to match characteristics in sensitivity among the imaging sensors.

SUMMARY

However, when the adjustment of the absolute value such as the color becomes necessary due to improvement of image quality, the adjustment among the imaging sensors is not enough. Therefore, conventionally there is a problem that processing needs to be performed outside the image forming apparatus, and this becomes a burden.

The purpose of the present invention is to provide an image forming apparatus, an image reading apparatus, and a calibration method so as to be able to calibrate imaging sensors more easily and accurately.

To achieve at least one of the abovementioned objects, according to an aspect of the present invention, an image forming apparatus reflecting one aspect of the present invention includes, a conveyor that moves a medium on a predetermined conveying path; an imager that includes a plurality of imaging sensors and that images a surface of the medium on the conveying path; a color measurer that measures a color of the surface of the medium on the conveying path;

and a hardware processor, wherein, an imaging range imaged by each of the plurality of imaging sensors includes an overlapping portion between the imaging sensors adjacent in a width direction orthogonal to a conveying direction along the conveying path, the hardware processor performs a calibration operation of a first sensor based on a color measuring result of a predetermined inspection image measured within a standard imaging range of the first sensor among the plurality of imaging sensors, and a standard imaging result within the standard imaging range imaging an inspection image with a same pattern as the inspection image, and the hardware processor compares imaging results by the plurality of imaging sensors in the overlapping portions and performs the calibration operation of another sensor different from the first sensor using the standard imaging result as a standard.

According to another aspect, an image reading apparatus includes: a conveyor that moves a medium on a predetermined conveying path; an imager that includes a plurality of imaging sensors and that images a surface of the medium on the conveying path; a color measurer that measures a color of the surface of the medium on the conveying path; and a hardware processor, wherein, an imaging range imaged by each of the plurality of imaging sensors includes an overlapping portion between the imaging sensors adjacent in a width direction orthogonal to a conveying direction along the conveying path, the hardware processor performs a calibration operation of a first sensor based on a color measuring result of a predetermined inspection image measured within a standard imaging range of the first sensor among the plurality of imaging sensors, and a standard imaging result within the standard imaging range imaging an inspection image with a same pattern as the inspection image, and the hardware processor compares imaging results by the plurality of imaging sensors in the overlapping portions and performs the calibration operation of another sensor different from the first sensor using the standard imaging result as a standard.

According to another aspect, a calibration method of an imaging sensor in an image forming apparatus including a conveyor that moves a medium on a predetermined conveying path, and an imager that includes a plurality of imaging sensors and that images a surface of the medium on the conveying path, wherein, an imaging range imaged by each of the plurality of imaging sensors includes an overlapping portion between the imaging sensors adjacent in a width direction orthogonal to a conveying direction along the conveying path, the method including: performing a first calibration operation on a first sensor based on a color measuring result of a predetermined inspection image measured within a standard imaging range of the first sensor among the plurality of imaging sensors, and a standard imaging result within the standard imaging range imaging an inspection image with a same pattern as the inspection image, and performing a second calibration operation of another sensor different from the first sensor using the standard imaging result as a standard by comparing imaging results by the plurality of imaging sensors in the overlapping portions.

BRIEF DESCRIPTION OF THE DRAWINGS

The advantages and features provided by one or more embodiments of the invention will become more fully understood from the detailed description given hereinafter and the appended drawings which are given by way of illustration only, and thus are not intended as a definition of the limits of the present invention, and wherein.

DETAILED DESCRIPTION OF EMBODIMENTS

An embodiment of the present disclosure is described with reference to the drawings.

Figure 1:
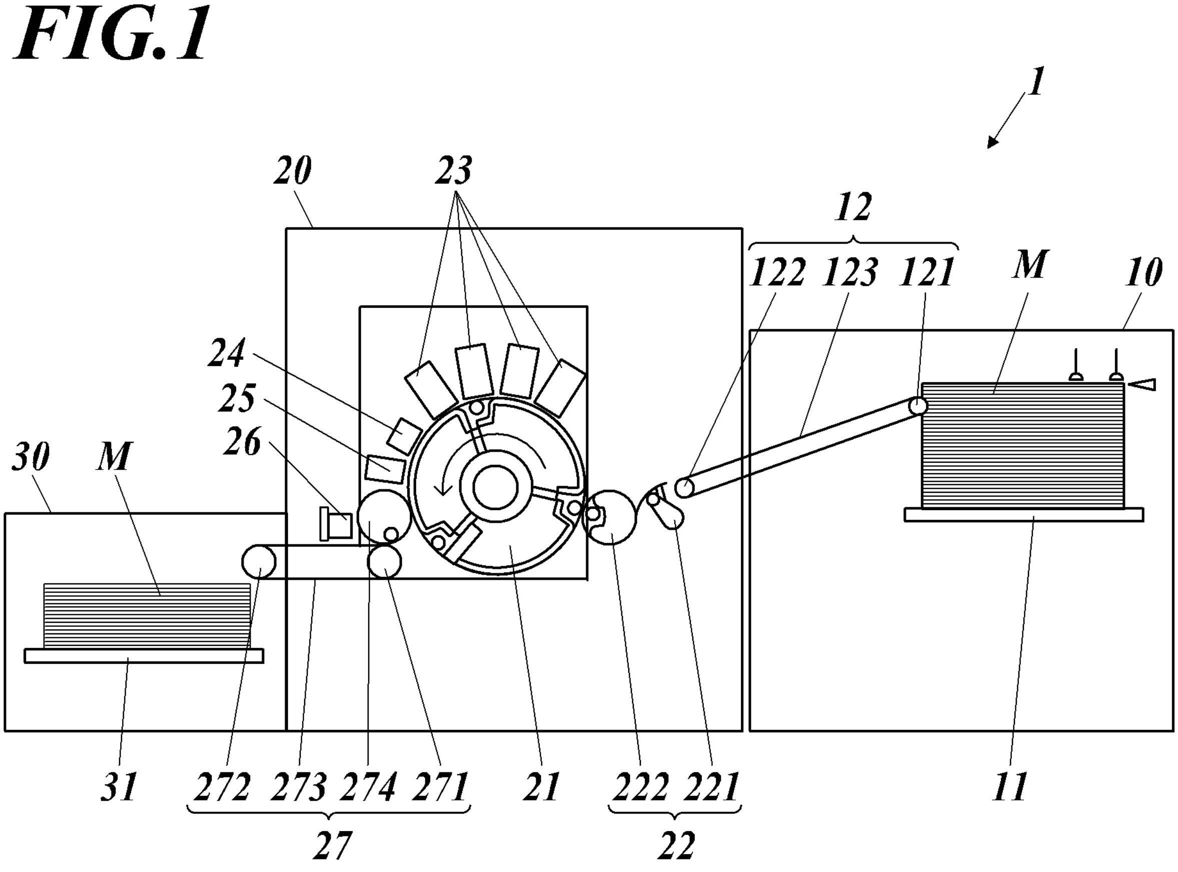
FIG. 1 is a schematic diagram showing an entire configuration of an image forming apparatus according to one embodiment viewed from the front.

FIG. 1 is a schematic drawing showing an entire configuration of the image forming apparatus 1 according to the present embodiment viewed from the front.

Figure 3:
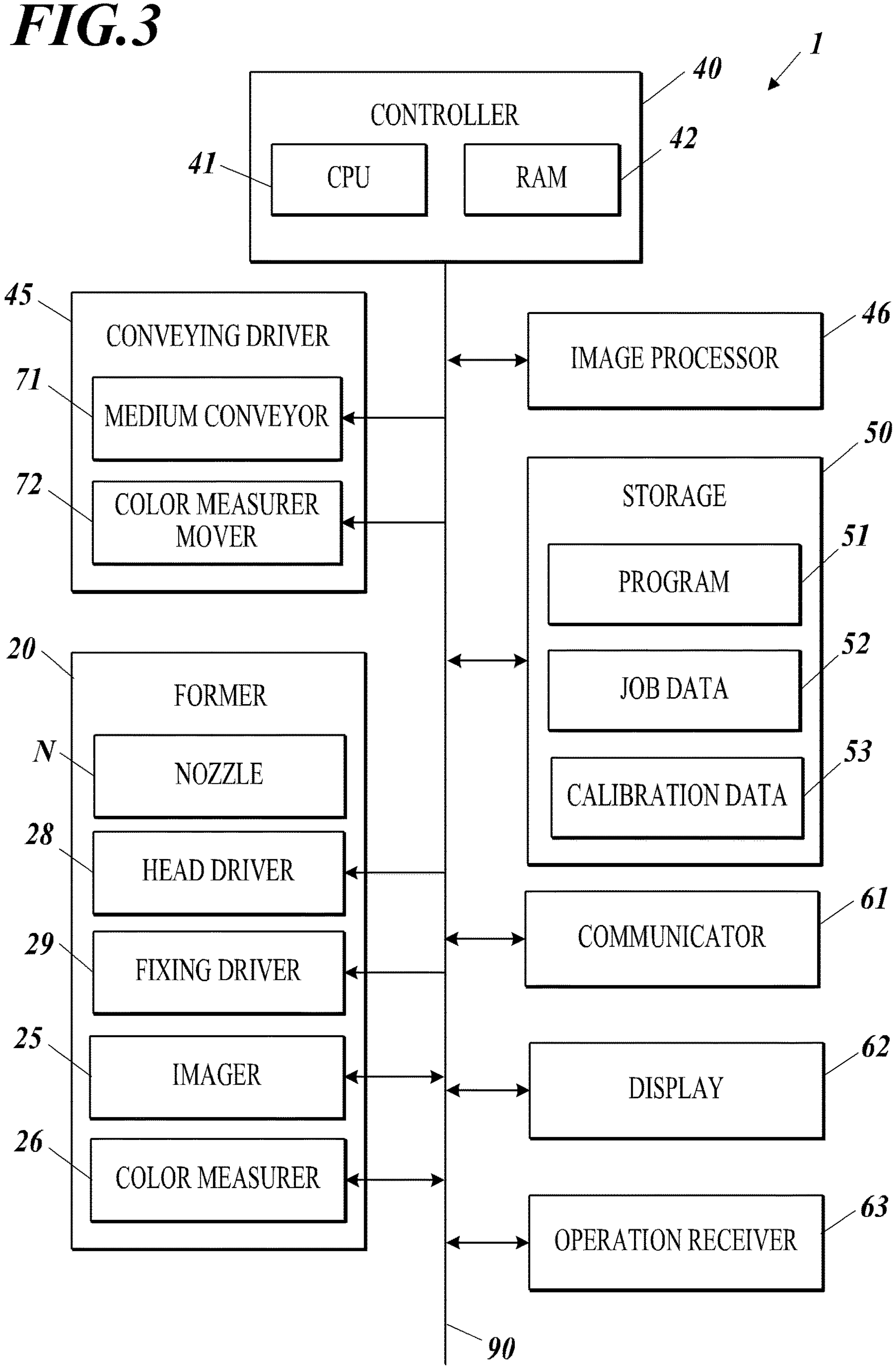
FIG. 3 is a block diagram showing a configuration of the functions in the image forming apparatus.

The image forming apparatus 1 includes a medium supplier 10, a former 20, a medium discharger 30, and a controller 40 (see FIG. 3). Based on the control operation by the controller 40, in the image forming apparatus 1, the medium M in which the image is formed is sent out from the medium supplier 10 to the former 20 and the medium M is discharged from the medium discharger 30 after the image is formed.

The medium supplier 10 includes a medium supplier tray 11 and a supply conveyor 12.

The medium supplier tray 11 is a plate shaped member provided so that one or a plurality of media M can be placed. The medium supply tray 11 moves up and down according to the amount of the placed media M and the medium M on top is held at a conveying start position by the supplying conveyor 12.

As the medium M, various media such as printing paper with various thicknesses, cells, films, and cloths can be used. The medium M may include a surface with non-absorbing properties in which ink does not penetrate inside.

The supply conveyor 12 includes a plurality of (for example, two) rollers 121 and 122, a ring shaped belt 123 supported by the rollers 121 and 122 from the inner side surface, and a supplier (not shown) which passes the medium M placed at the top in the medium supply tray 11 to the belt 123. In the supply conveyor 12, according to the rotating movement of the belt 123 caused by the rotation of the rollers 121 and 122, the medium M passed from the supplier onto the belt 123 is conveyed and sent to the former 20.

The former 20 includes an image forming drum 21, a passing unit 22, a head unit 23 (forming operator), a fixer 24, an imager 25, a color measurer 26, and a deliverer 27.

The shape of the outer surface of the image forming drum 21 is a cylinder shape. The medium M is placed on the outer surface (conveying surface) and the medium M is moved along a (predetermined) conveying path according to the rotating operation of the image forming drum 21. On the inner surface side of the image forming drum 21, the heater is provided and the conveying surface may be heated so that the medium M placed on the conveying surface becomes a predetermined setting temperature.

The passing unit 22 passes the medium M received from the supply conveyor 12 to the image forming drum 21. The passing unit 22 is provided in the position between the supply conveyor 12 of the medium supplier 10 and the image forming drum 21. The passing unit 22 includes a nail 221 which holds one end of the medium M sent by the supply conveyor 12 and a cylinder passing drum 222 which guides the medium M held by the nail 221. The medium M obtained by the nail 221 from the supply conveyor 12 is sent to the passing drum 222 and moved along the outer surface of the rotating passing drum 222. Then, the medium M is guided to the outer surface of the image forming drum 21 and passed to the image forming drum 21.

The head unit 23 ejects droplets of ink from the plurality of nozzle openings provided on the ink ejecting surface facing the medium M to points on the surface of the medium M moving on the conveying path according to the rotation of the image forming drum 21 on which the medium M is placed and the image is formed. According to the image forming apparatus 1 of the present embodiment, the head unit 23 is separated from the outer surface of the image forming drum 21 in a distance set in advance, and four head units 23 are positioned with a predetermined interval. The four head units 23 each output one color of ink among four colors consisting of cyan, magenta, yellow, and black (CMYK). Here, the ink of each color is ejected in order from the upstream side of the conveying direction of the medium M in the order of C, M, Y, K. However, the configuration is not limited to the above. Any type of ink can be used, and here, ink which changes between a sol state and a gel state depending on temperature and which is hardened and fixed by receiving a predetermined active energy ray such as ultraviolet rays is used. The ink ejected from the head unit 23 in a sol state lands on the medium M, the temperature decreases and the ink quickly changes to a gel state and the viscosity increases. Then, the ink is fixed on the medium M by the ultraviolet rays emitted from the fixer 24.

Here, each head unit 23 includes a line head which is capable of forming an image in a width that the image is formed on the medium M by combining with the rotation of the image forming drum 21.

The fixer 24 emits the predetermined active energy ray, here, the ultraviolet ray as described above, on the surface of the medium M. The fixer 24 includes an LED lamp which emits light by ultraviolet rays. The fixer 24 is positioned in a position near the outer surface of the image forming drum 21 and in a position so that after the ink is ejected from the head unit 23 onto the medium M conveyed by rotating the image forming drum 21, it is possible to emit the ultraviolet rays to the medium M in a range before the medium M is passed from the image forming drum 21 to the deliverer 27. The fixer 24 includes a shielding member and sufficiently reduces the amount of ultraviolet rays reaching the area other than the predetermined range of the medium M on the conveying surface compared to the amount reaching the predetermined range.

The imager 25 images the surface of the medium M at the downstream side of the head unit 23 and the fixer 24 in the conveying direction on the conveying path and outputs the contents as read data to the controller 40. The imager 25 includes a plurality of line sensors (imaging sensors). The line sensor is not limited, and can be, for example, a CMOS sensor. The imager 25 measures an amount of incident light with three wavelengths of RGB, and obtains a brightness value for each of the above.

The color measurer 26 measures the color of the surface of the medium M at the downstream side of the head unit 23 and the fixer 24 in the conveying direction on the conveying path, here, more to the downstream side than the imager. The color measuring result is output to the controller 40. The position where the color measurer 26 measures the color is on the belt 273 of the deliverer 27 and not on the image forming drum 21, but the configuration is not limited to the above. The color space which can be obtained by measurement by the color measurer 26 can be changed, and a color value in the L*a*b* color space can be output.

The deliverer 27 conveys the medium M in which the ink is discharged and fixed from the image forming drum 21 to the medium discharger 30. The deliverer 27 includes a plurality of (for example two) rollers 271 and 272, a ring shaped belt 273 which is supported by the rollers 271 and 272 from the inner side surface, and a cylinder shaped passing roller 274. The deliverer 27 guides the medium M on the image forming drum 21 onto the belt 273 using the passing roller 274. The passed medium M is moved together with the belt 273 rotating with the rotation of the rollers 271 and 272 and conveyed. With this, the medium M is sent to the medium discharger 30.

The medium discharger 30 stores the medium M in which the image is formed and which is sent out from the former 20 until the user takes out the medium M. The medium discharger 30 includes a plate shaped medium discharger tray 31 in which the medium M conveyed by the deliverer 27 is placed.

Figure 2A:
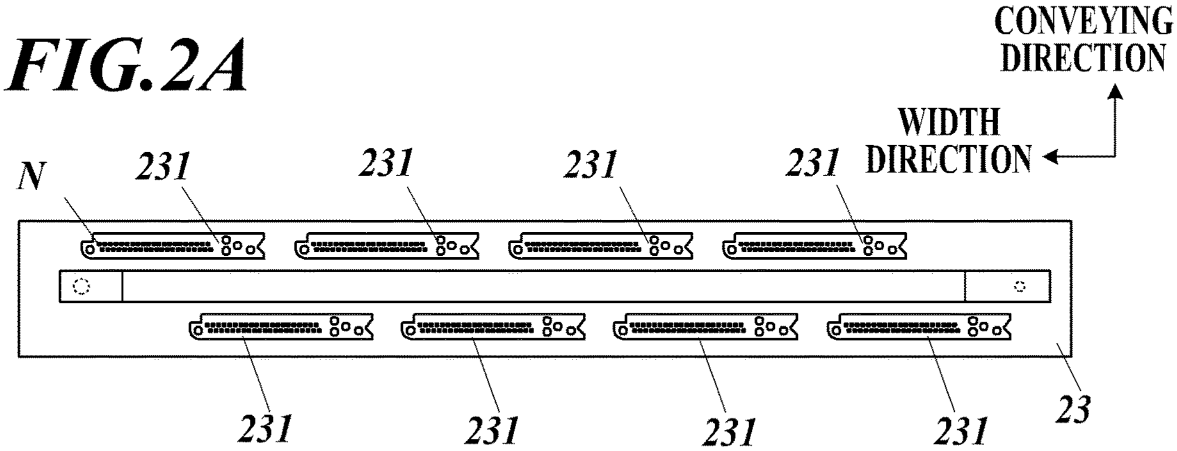
FIG. 2A to FIG. 2C are diagrams describing a head unit, an imager, and a color measurer.
Figure 2B:
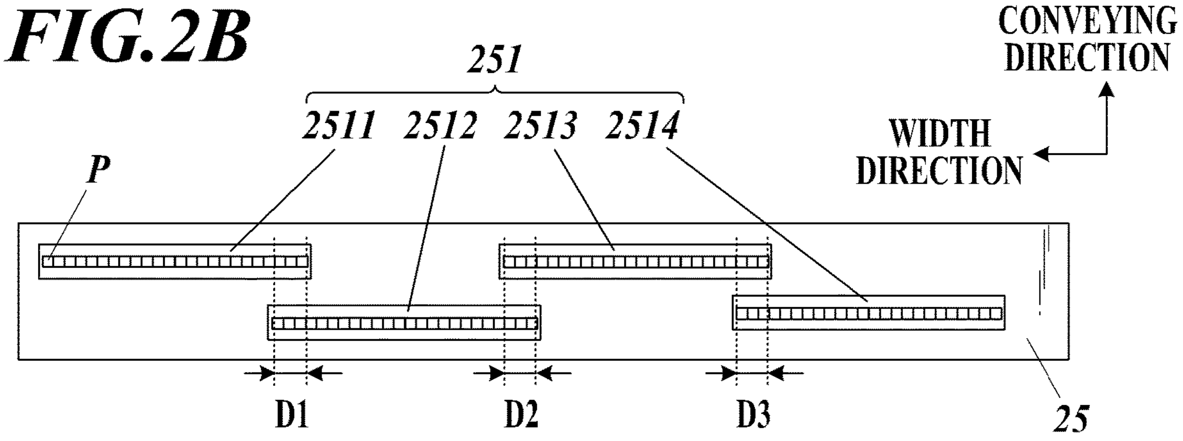
Figure 2C:
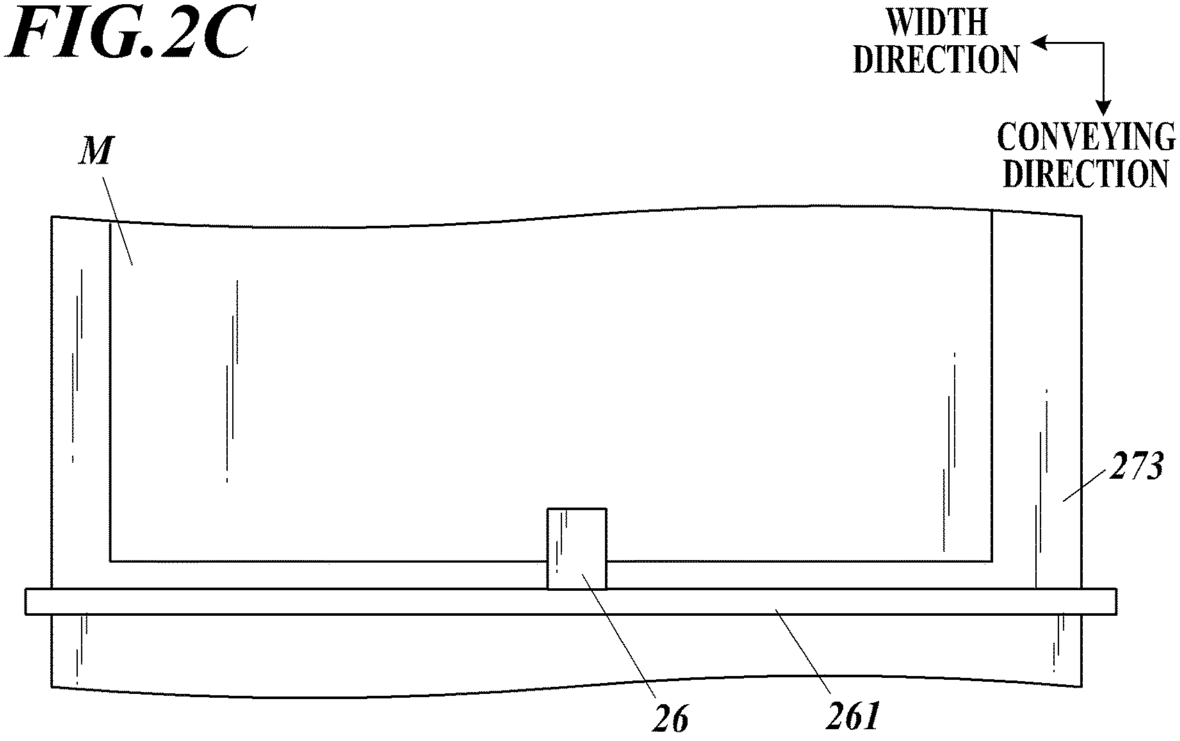

FIG. 2A is a bottom view viewing the head unit 23 from the conveying surface side of the image forming drum 21, FIG. 2B is a diagram viewing the light entering surface of the imager 25 from the side opposed to the outer surface of the image forming drum 21, and FIG. 2C is a diagram viewing the color measurer 26 from above the outer surface of the belt 273.

As shown in FIG. 2A, the head unit 23 includes a plurality of inkjet heads 231 in which openings of a plurality of nozzles N are arranged in a predetermined range (arrangement range) at the bottom surface. Here, one head unit 23 includes eight inkjet heads 231, but the configuration is not limited to the above. In the eight inkjet heads 231, two rows of nozzle rows are arranged in the conveying direction with the openings of the nozzles N aligned in a width direction orthogonal to the conveying direction. The opening position of the two rows of nozzles N are in a hound's tooth shape to be positioned alternate in the width direction. The size of the openings of the nozzle N is shown largely and the number of openings of the nozzle N is shown in a small number for ease of description, and the actual configuration is different.

As shown in FIG. 2B, the imager 25 includes a plurality of imaging sensors 251 in which light incident openings to a plurality of imaging elements P are positioned in a predetermined range in the width direction. Here, the imager 25 includes four imaging sensors 251 which are a first imaging sensor 2511, a second imaging sensor 2512, a third imaging sensor 2513 and a fourth imaging sensor 2514, but the configuration is not limited to the above. According to the present embodiment, at least the first imaging sensor 2511 is the first sensor, and the third imaging sensor 2513 can be included in the plurality of first sensors. The second imaging sensor 2512 and the fourth imaging sensor 2514 are included in the other sensor (second sensor). The imaging sensor 251 is positioned in a hound's tooth shape, and the light incident range to the light incident opening in each imaging sensor 251, that is, the imaging range includes overlapping portions D1 to D3 between the adjacent imaging sensors 251. The position of the light incident opening of each imaging element P and the position of each light receiving sensor can be the same in the width direction. For example, a contact image sensor (CIS) can be used or an optical reduction system such as a mirror and lens can be used so that the light receiving sensor is collectively positioned near the center in the width direction. When color imaging is performed by mainly RGB, the imaging element P of the line sensor does not have to be arranged one dimensionally in only the width direction. For the ease of description, the light incident opening is shown largely divided in a few units, but actually, the light incident openings can be one string or can be divided finely according to resolution (number of elements) of the light receiving sensor. The relationship of size between the imaging resolution of the imager 25 and the image forming resolution of the head unit 23 is not limited here.

As shown in FIG. 2C, the color measurer 26 measures the color in one area of the medium M in the width direction. The color measurer 26 is capable of moving in the width direction along a supporter 261. For example, a rail or a belt is provided in the supporting member 261, and the color measurer 26 can move back and forth on the rail according to the movement of the belt. The color measurer 26 is fixed when the color is measured and measures the color of the color measuring range.

FIG. 3 is a block diagram showing a functional configuration of the image forming apparatus 1 of the present embodiment.

In addition to the above-described former 20, the image forming apparatus 1 includes a controller 40, a conveying driver 45, an image processor 46, a storage 50, a communicator 61, a display 62, an operation receiver 63, and a bus 90.

In addition to the above described imager 25, color measurer 26, and nozzle N (included in the head unit 23), the former 20 includes a head driver 28 which allows ink to be ejected from the nozzle N and a fixing driver 29 which allows the fixer 24 to be operated.

The head driver 28 operates the mechanism to apply pressure to the ink in the ink flow path which is in communication with the nozzles N and which supplies ink, and allows the head unit 23 (inkjet head 231) to perform an image forming operation. For example, the head driver 28 generates a driving voltage signal for a piezoelectric element to deform a wall surface of a pressuring unit (pressure chamber) provided in the ink flow path and outputs the driving voltage signal to the piezoelectric element. Based on the control signal from the controller 40, the head driver 28 selects a voltage waveform pattern stored in advance and generates the driving voltage signal with the voltage amplified. The head driver 28 switches whether the driving voltage signal can be output to the piezoelectric element according to forming target image data input from the storage 50. When the piezoelectric element is deformed, the pressure chamber is deformed. A fluctuation of pressure is applied to the ink in a predetermined pattern. In response to the above, ink droplets in a desired amount is ejected at a desired liquid amount to a predetermined ink landing position (position viewed from a plane view) from an opening of the nozzle N.

The fixing driver 29 outputs the driving signal to the fixer 24 and emits (emits light) the predetermined active energy rays (here, ultraviolet rays).

The controller 40 controls the entire operation of the image forming apparatus 1 and controls the operation of each unit. The controller 40 includes a CPU 41 (Central Processing Unit), a RAM 42 (Random Access Memory) and the like.

The CPU 41 performs various computing processes, and controls the conveying of the medium M, the supply, temperature management, and ejecting of ink, imaging, color measurement, maintenance operation and the like in the image forming apparatus 1. The CPU 41 performs various processes regarding the image forming based on image data, various status signals and clock signals and the like according to the program read from the storage 50.

The RAM 42 provides a memory space for work to the CPU 41 and stores temporary data. The RAM 42 may include a nonvolatile memory, and the data stored in the nonvolatile memory and the data stored in the storage 50 are suitably allocated.

The image processor 46 performs various processes on the image data. Various processes include, processes regarding calibration of the imaging sensor 251 based on the imaging result of the imager 25 and the color measuring result of the color measurer 26. The image processor 46 may include a CPU and a RAM, and in addition to the above, or instead of the above, the image processor 46 may include a dedicated hardware circuit. The CPU 41 and the RAM 42 of the controller 40 may also serve as the hardware for the image processor 46.

When the image formed on the medium M is imaged by the imager 25, the image processor 46 connects each image obtained by the plurality of image sensors 251 and generates one imaging data. Regarding the overlapping portions D1 to D3 shown in FIG. 2B, it is determined in advance the imaged data from which imaging sensor 251 is used from the two adjacent imaging sensors 251. The data which is not used can be disposed.

The storage 50 stores job data 52 regarding image forming obtained from outside through the communicator 61, and control programs and setting data regarding various control operations of the controller 40 and the image processor 46. As the configuration to temporarily store the job data 52 and the processing data, a DRAM is mainly used. As the configuration to store the control program and the setting data, an HDD (Hard Disk Drive) and a nonvolatile memory are used. However, the configuration is not limited to the above. For example, the job data 52 can be stored in a nonvolatile memory, and the initial program and the initial setting data can be stored in a mask ROM which cannot be rewritten or updated. The data which is not for normal images, for example, data of specific images such as images for inspection and setting data which form such specific images can be stored in the nonvolatile memory. The control program includes a calibration program 51 with which sensitivity among the imaging sensors 251 is adjusted.

The data stored in the storage 50 includes calibration data 53 obtained by executing the program 51. For example, the imaging data by the imager 25 is calibrated by the calibration data 53 and then analysis processing is performed.

The conveying driver 45 includes a medium conveyor 71 which allows the units which convey the medium M such as the supply conveyor 12, the image forming drum 21, the passing unit 22, and the deliverer 27 to perform the operations, and a color measurer mover 72 which moves the color measurer 26.

The medium conveyor 71 includes a motor which allows the rollers and the drums to rotate and which allows the nail 221 to operate. Among the above configurations, at least the image forming drum 21 and the conveying driver 45 are included in a conveyor which moves the medium M on a predetermined conveying path in the image forming apparatus 1 according to the present embodiment.

The color measurer mover 72 moves the color measuring range measured by the color measurer 26 in the width direction. For example, when the rail and the belt are provided to the supporter 261 as described above, the color measurer mover 72 moves the belt a predetermined distance at a predetermined speed, and with this, the color measurer 26 fixed to the belt is moved in the same distance.

The communicator 61 is a communicating interface which controls the communication operation with external devices. The communication interface includes one or a plurality of those corresponding to various communication protocols, examples including a LAN card. The communicator 61 obtains image data as the target of forming and setting data (job data) regarding image forming from external devices based on control by the controller 40. The communicator 61 is able to transmit status information to the external devices.

The display 62 displays the status and the operation menu of the image forming apparatus 1 in response to the control signal from the controller 40. The display 62 includes a display screen such as a liquid crystal screen. The display 62 can include an LED used in a notification operation.

The operation receiver 63 receives operation by the user and outputs the contents to the controller 40. For example, the operation receiver 63 includes a touch sensor which is provided overlapped with the display screen. The information regarding the contents and the position of the menu displayed on the display screen is corresponded with the information regarding the type and the position of the touch operation by the user received on the operation receiver 63. The controller 40 controls the processes to be performed by the units in the image forming apparatus 1 in response to the operation. The operation receiver 63 may include a press button switch, numeric keys and the like.

The bus 90 is a signal transmitting path which electrically connects the controller 40 with other structures to communicate signals.

Among the above structures, the image reading apparatus according to the present embodiment includes the conveyor, the imager 25, the color measurer 26, and the controller 40. The image reading apparatus according to the present embodiment may include the color measurer mover 72.

Next, the operation and the adjustment of the imaging sensor 251 of the imager 25 in the image forming apparatus 1 according to the present embodiment is described.

Figure 4A:
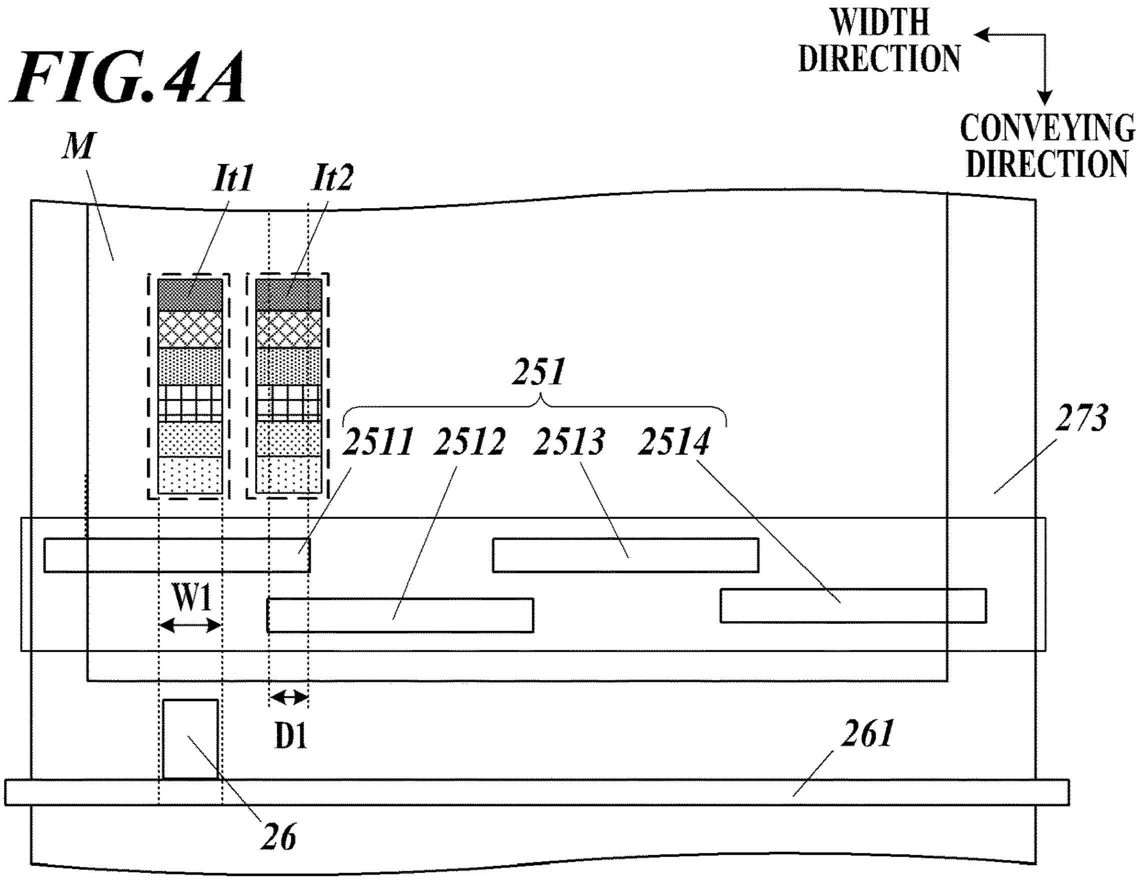
FIG. 4A and FIG. 4B are diagrams describing calibration of an imaging sensor.
Figure 4B:
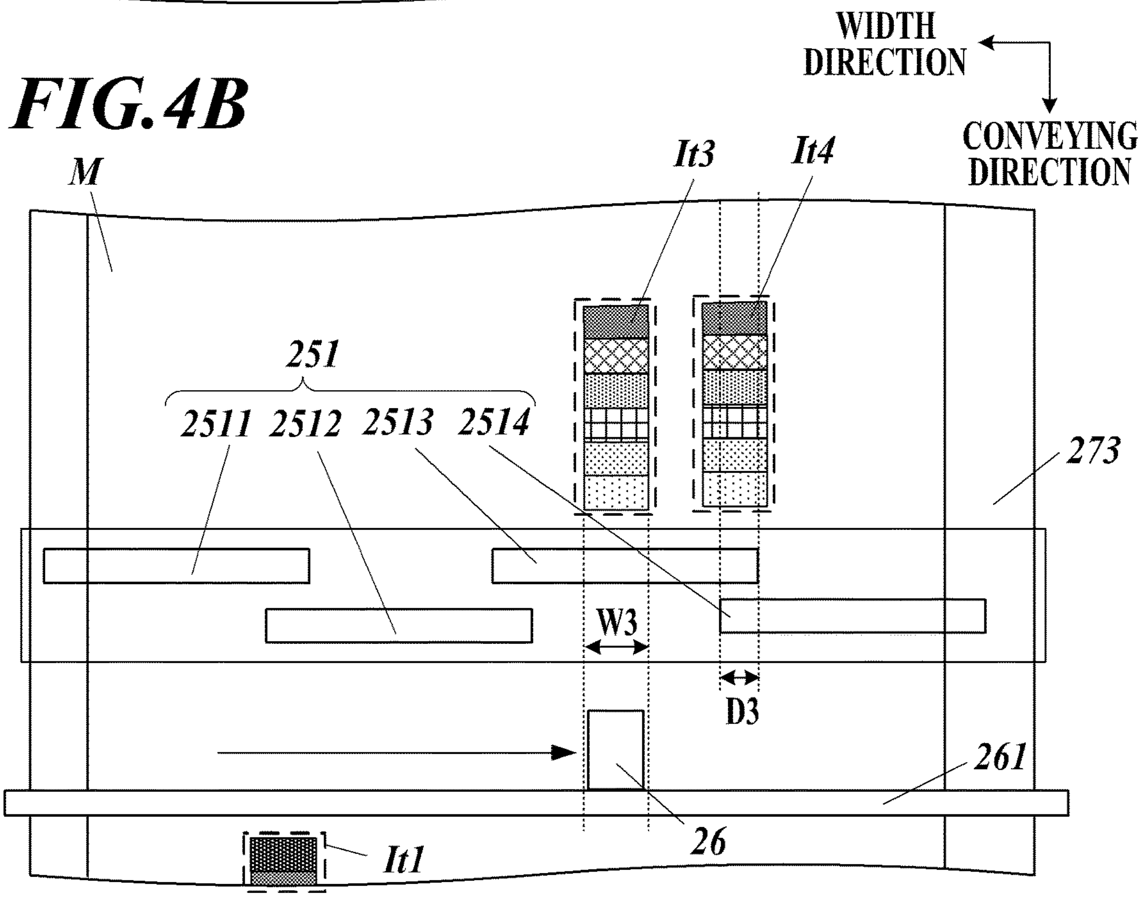

FIG. 4A and FIG. 4B are diagrams describing the calibration of the imaging sensor 251.

When the imaging result of the four imaging sensors 251 are connected to be combined and generated as one imaging data, since there are differences in the imaging characteristics of the imaging sensors 251, the output characteristics of the imaging data are matched. First, as shown in FIG. 4A, in the image forming apparatus 1 according to the present embodiment, inspection images It1 and It2 (predetermined inspection image) with the same pattern are formed in the imaging range (standard imaging range) of the first imaging sensor 2511 in the same position in the conveying direction. The imaging result (standard imaging result) of the inspection image It2 by the first imaging sensor 2511 is compared with the color measuring result of the inspection image It1 in the range W1 within the imaging range of the first imaging sensor 2511. With this, the first imaging sensor 2511 is calibrated. Next, based on a shift (difference) of the imaging result by the second imaging sensor 2512 using as the standard the imaging result by the first imaging sensor 2511 imaging the inspection image It2 in the overlapping portion D1 (first overlapping portion overlapped with the first imaging sensor 2511), a calibration degree of the second imaging sensor 2512 is set, and the calibration is performed. The relative adjustment (correction) such as sensitivity variation in each position in the width direction in the first imaging sensor 2511 and the second imaging sensor 2512 can be performed by well-known techniques.

Similarly, as shown in FIG. 4B, the inspection images It3 and It4 are formed in the same position in the conveying direction. The imaging result of the inspection image It4 by the third imaging sensor 2513 is compared with the color measuring result of the inspection image It3 in the range W3 within the imaging range of the third imaging sensor 2513. With this, the third imaging sensor 2513 is calibrated. Next, based on the shift of the imaging result by the fourth imaging sensor 2514 using as the standard the imaging result by the third imaging sensor 2513 imaging the inspection image It4 in the overlapping portion D3, the calibration degree of the fourth imaging sensor 2514 is set and the calibration is performed.

That is, according to the present embodiment, the second imaging sensor 2512 is included in the range determined for the first imaging sensor 2511, and the fourth imaging sensor 2514 is included in the range determined for the third imaging sensor 2513.

The calibration operation is performed by matching the results of reading the inspection images It1 and It2 by the imaging sensor 251 and the color measurer 26. For example, the image processor 46 converts the measured color value in the L*a*b* color space measured by the color measurer 26 to the RGB brightness value, and the RGB value is made close to the RGB value obtained in the imaging sensor 251. With this, the calibration amount is calculated.

After measuring the color in the range W1, the color measurer 26 is moved to the range W3. Therefore, the inspection images It1 and It2 are formed in a position different from the inspection images It3 and It4 in the conveying direction.

Figure 5:
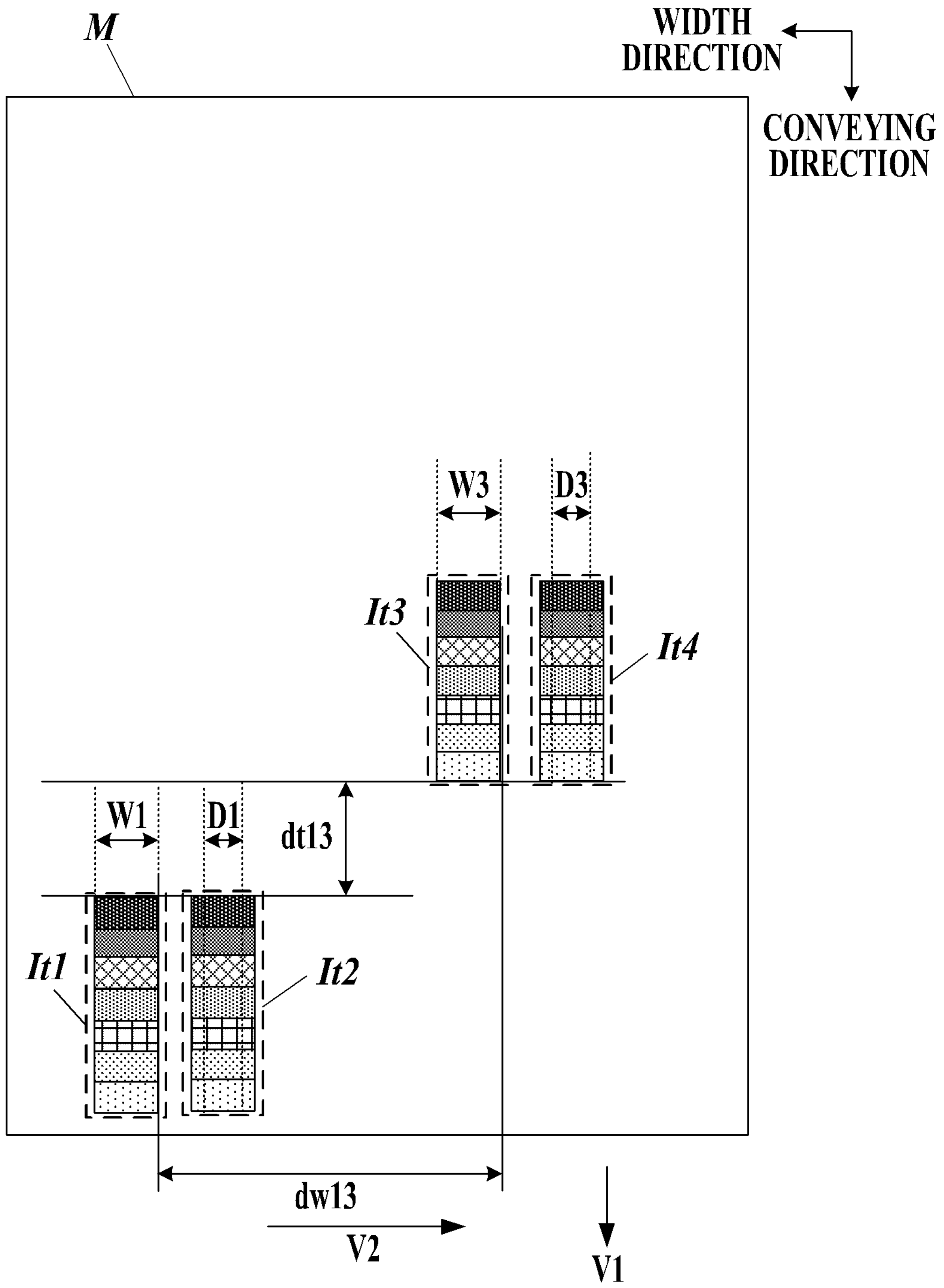
FIG. 5 is a diagram describing the relation of the positions of inspection images.

FIG. 5 is a diagram describing the relation of the positions in the inspection images It1 to It4.

As shown in FIG. 5, the inspection images It3 and It4 are positioned in a position moved in the direction along the conveying path, that is, to the downstream side from the positions of the inspection images It1 and It2 in the conveying direction for an amount of time necessary to move the color measurer 26 and to start the reading. Based on a distance dw13 (moving distance of the color measurer 26) between the ranges W1 and W3 (for example, between the center positions), moving speed V2 of the color measurer 26, and the conveying speed V1 of the medium M (moving speed of the medium M), a distance dt13 between the position which is most upstream (last end) of the inspection image It1 and the position which is most downstream (top end) of the inspection image It3 can be determined as dt13≥dw13×(V2/V1). In order to make the distance dt13 shorter, the conveying speed V1 can be decreased (changed) according to the relation between the desired distance dt13 and the distance dw13 (relation of the positions of the inspection images It1 to It4) and the moving speed V2.

For example, the inspection images It1 to It4 are small regions (patch images) in each color (each density) necessary for calibration positioned in order in the conveying direction. As shown in FIG. 5, after the measuring of the color is complete in the range W1 of the inspection image It1, the color measuring range of the color measurer 26 moves to the range W3 before the inspection image It3 reaches the color measuring position by the conveying movement of the medium M. Then, the measuring of the color of the inspection image It3 is performed in the range W3.

Figure 6:
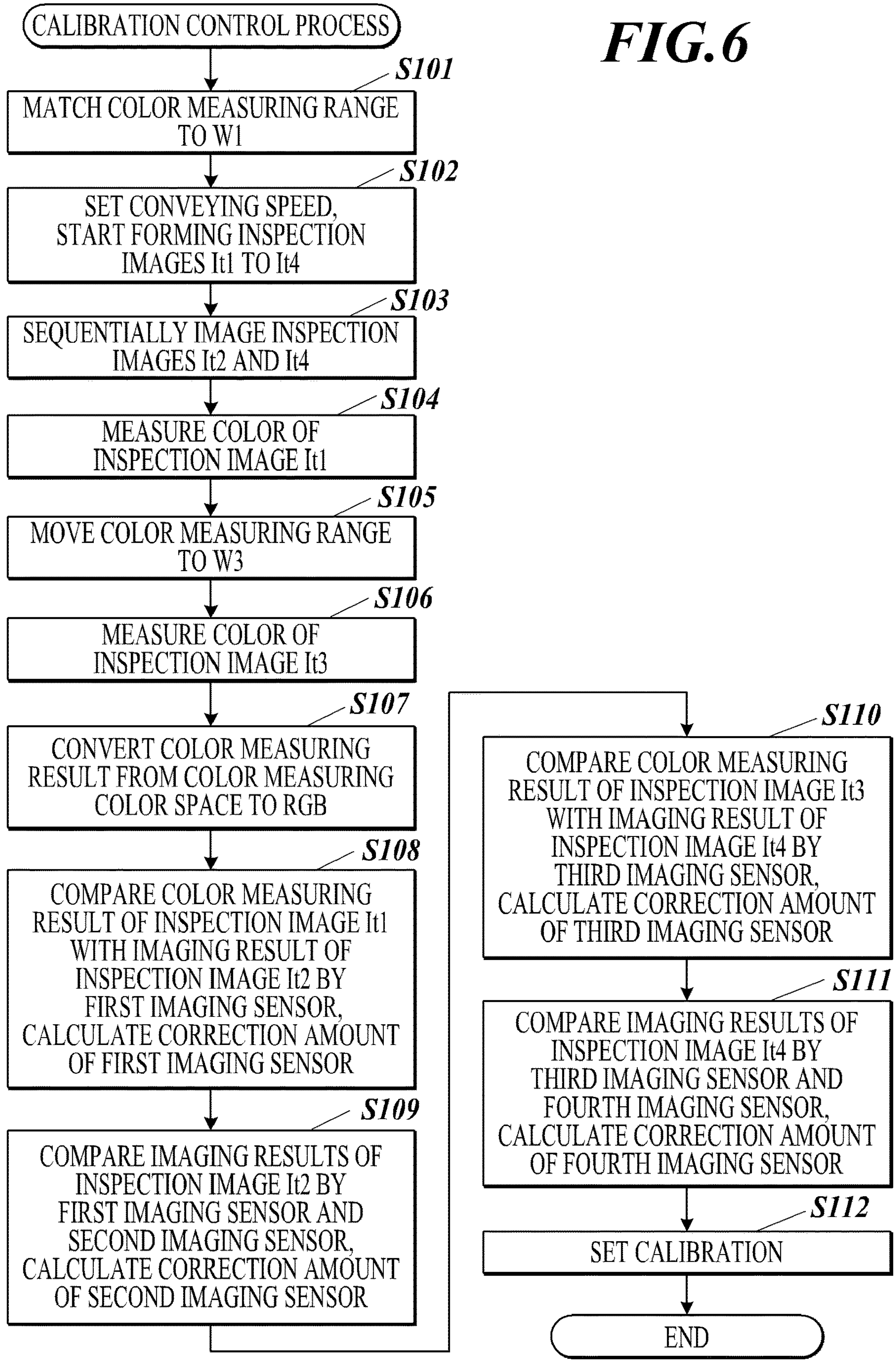
FIG. 6 is a flowchart showing a control procedure of a calibration control process.

FIG. 6 is a flowchart showing a control procedure by the controller 40 in the calibration control process including the calibration method of the present embodiment.

When the calibration control process starts, the controller 40 (CPU 41) matches the color measuring range of the color measurer 26 to the range W1 (step S101). The controller 40 sets the conveying speed of the medium M by the medium conveyor 71, starts the conveying operation, and forms the inspection images It1 to It4 on the conveyed medium M in the positions with the above relation (step S102).

When the formed inspection images It2 and It4 reach the imaging range by the imager 25, the controller 40 controls the imager 25 to sequentially image the inspection images It2 and It4 (step S103). When the formed inspection image It1 reaches the color measuring range by the color measurer 26, the controller 40 controls the color measurer 26 to measure the color of the inspection image It1 (step S104).

The controller 40 moves the color measurer 26 to the range W3 at the moving speed V2 (step S105). After the moving ends, when the inspection image It3 reaches the color measuring range by the color measurer 26, the controller 40 controls the color measurer 26 to measure the color of the inspection image It3 (step S106).

The controller 40 converts the color measured result of the inspection images It1 and It3 by the color measurer 26 to the RGB brightness value (step S107). The controller 40 compares the color measuring result of the inspection image It1 with the imaging result of the inspection image It2 by the first imaging sensor 2511, and calculates the correction amount regarding the reading of the first imaging sensor 251 (step S108; first calibration step). The controller 40 compares the imaging result of the inspection image It2 by the first imaging sensor 2511 with that by the second imaging sensor 2512, and calculates the correction value of the second imaging sensor 2512 using the imaging result of the first imaging sensor 2511 as the standard (step S109; second calibration step).

The controller 40 compares the color measuring result of the inspection image It3 with the imaging result of the inspection image It4 by the third imaging sensor 2513 and calculates the correction amount regarding reading of the third imaging sensor 2513 (step S110). The controller 40 compares the imaging result of the inspection image It4 by the third imaging sensor 2513 with that by the fourth imaging sensor 2514, and calculates the correction value of the fourth imaging sensor 2514 using the imaging result of the third imaging sensor 2513 as the standard (step S111).

The controller 40 performs the calibration setting regarding the inspection images It1 to It4 (step S112). With this, the controller 40 ends the calibration control process.

Modification 1

Figure 7:
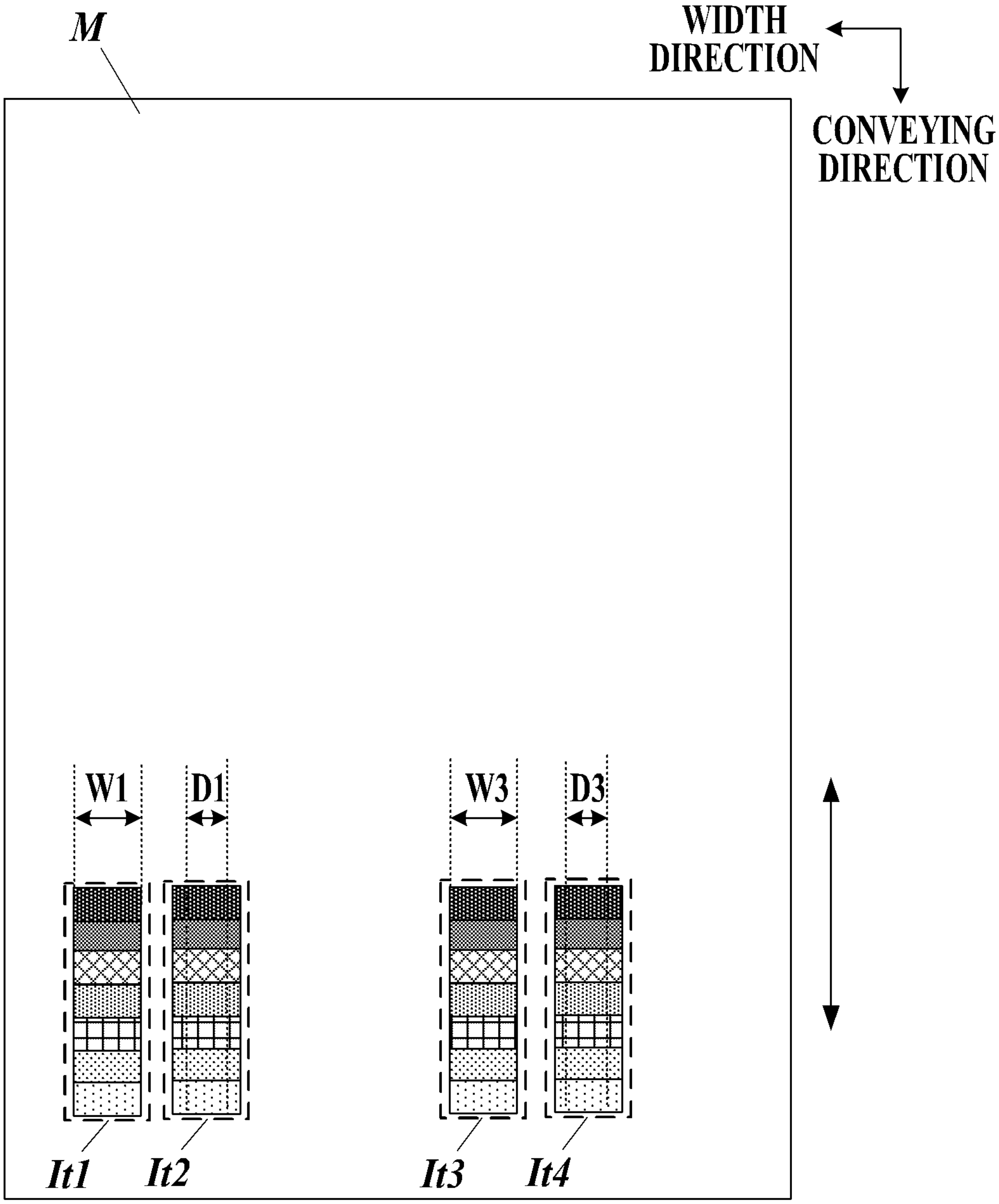
FIG. 7 is a diagram showing a modification 1 of a forming position of the inspection image and a calibration operation.

FIG. 7 is a diagram showing a modification 1 of the forming positions of the inspection images It1 to It4 and the calibration operation.

According to the above embodiments, the inspection images It1 to It4 are formed in positions different in the conveying direction to match to the conveying of the medium M. After the medium M in which the inspection images It1 and It2 are read is fed backwards, the medium conveyor 71 is operated so that the medium M passes the predetermined color measuring range in the conveying direction a plurality of times. When the remaining inspection images It3 and It4 can be read, the inspection images It1 to It4 can be formed in the same position in the conveying direction of the medium M. Alternatively, the color measurer 26 can be positioned opposed to the outer surface of the image forming drum 21 so that the color of the image on the medium M on the image forming drum 21 can be measured. Here, the medium M can be rotated a plurality of times (twice) without being peeled from the image forming drum 21 and the color can be measured each time the inspection images It1 to It4, which are in the same positions in the conveying direction of the medium M, pass the color measuring range. When the color measurer 26 can be measured at the same time in both the range W1 and W3, the inspection images It1 to It4 can be in the same positions in the conveying direction.

Figure 8:
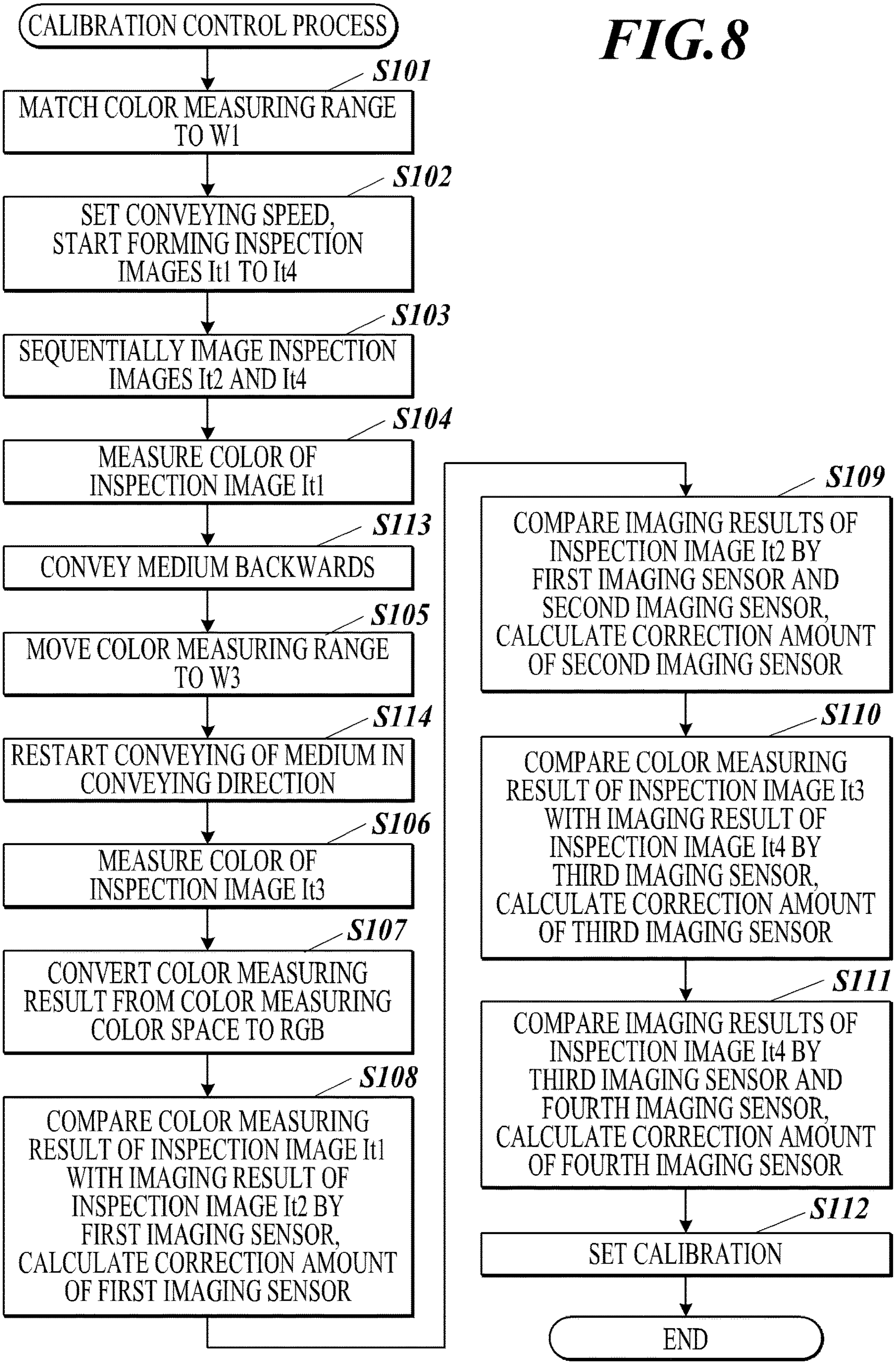
FIG. 8 is a flowchart showing a control procedure of the calibration control process in modification 1.

FIG. 8 is a flowchart showing the control procedure by the controller 40 of the calibration control process regarding the inspection images It1 to It4 according to the modification 1. With the exception of the point that the processes in steps S113 and S114 are added to the calibration control process according to the present embodiment, the calibration control process according to modification 1 includes the same processing contents, and the same reference numerals are applied to the same processing contents and the detailed description is omitted.

According to the process in step S104, after the color measurement of the inspection image It1 is finished, before the upstream end of the medium M is separated from the passing roller 274 (and outer surface of the image forming drum 21), the controller 40 stops the normal conveying operation in the conveying direction by the medium conveyor 71, and feeds the medium M backwards until the downstream end (leading portion) of the inspection images It1 to It4 return to the upstream side in the conveying direction than the color measuring range of the color measurer 26 (step S113). Then, the process by the controller 40 proceeds to step S105.

After the process in step S105, the controller 40 restarts the conveying of the medium M in the conveying direction (step S114). Then, the process by the controller 40 proceeds to step S106. The process in step S105 can be performed parallel with the process in step S113 and/or step S114.

Modification 2

FIG. 9 is a diagram showing a modification 2 of the forming positions of the inspection images It11 to It13 and the calibration operation.

According to the above-described embodiment and the modification 1, the ratio between the imaging sensor in which the color is measured and directly calibrated, and the imaging sensor which is compared among the imaging sensors and calibrated is 1:1, but here, the ratio is 1:2.

Figure 9A:
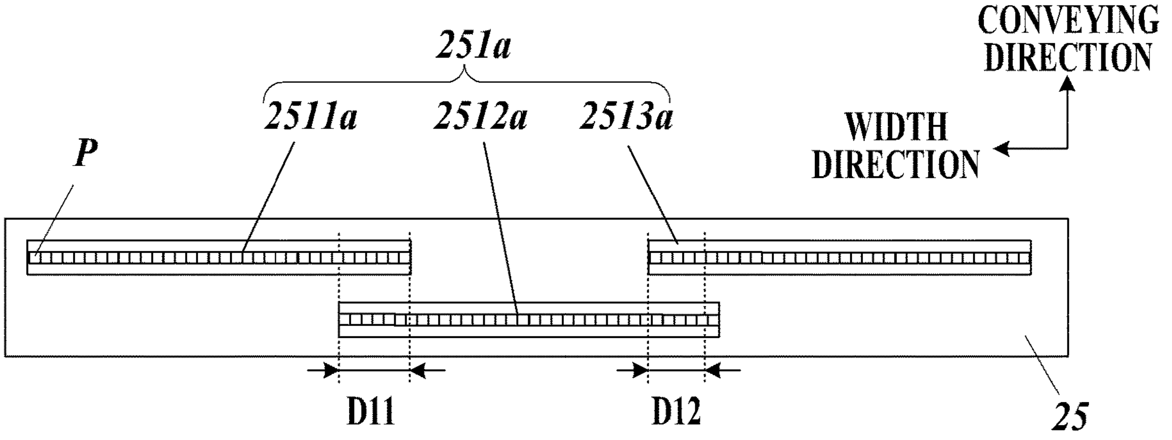
FIG. 9A and FIG. 9B are diagrams showing a modification 2 of a forming position of the inspection image and a calibration operation.

As shown in FIG. 9A, among the three imaging sensors 251*a*, a first imaging sensor 2511*a* (second sensor of modification) and a second imaging sensor 2512*a* (first sensor of modification) include an overlapping portion D11 (first overlapping portion of modification) and the second imaging sensor 2512*a* and a third imaging sensor 2513*a* (fourth sensor of modification) include an overlapping portion D12 (third overlapping portion of modification).

Figure 9B:
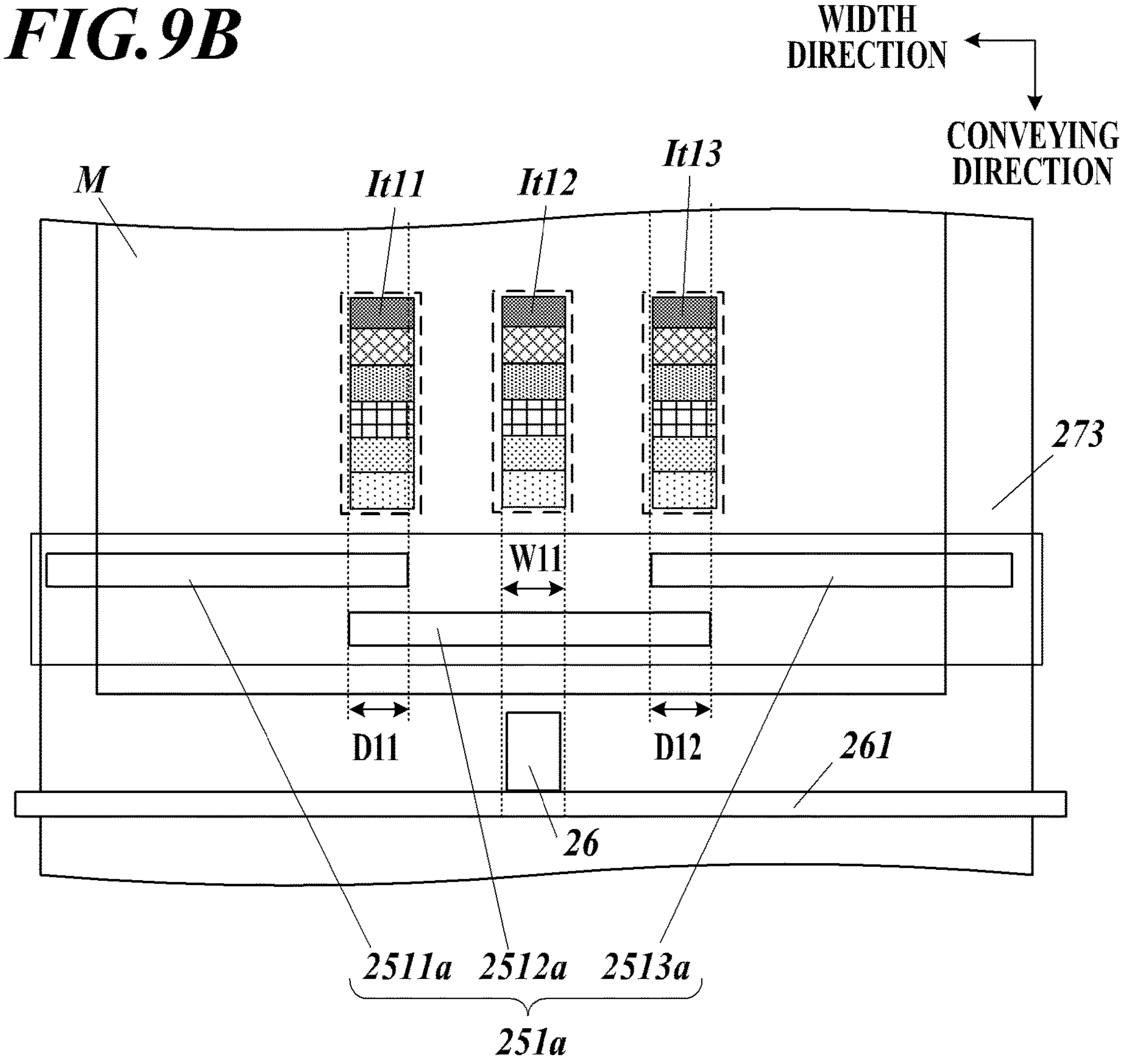

As shown in FIG. 9B, a range W11 in which color measurement is performed by the color measurer 26 is determined in the imaging range of the imaging sensor 2512*a* at the center in the width direction. All of the overlapping portions D11 and D12 are used for calibration by comparison among the imaging sensors 251*a*. To match the above, the inspection images It11 to It13 are formed in the range W11 of the color measurement and the overlapping portions D11 and D12.

Although the calibration is performed for three imaging sensors 251*a*, the color is measured in only one position which is the range W11. Therefore, there is no need to move the color measurer 26 and the color measurer 26 can be fixed. When there are four or more (six, etc.) imaging sensors 251*a*, the color measurer 26 can be moved to the imaging range of the imaging sensor other than the three imaging sensors.

Based on the result of the comparison between the color measuring result and the imaging result by the second imaging sensor 2512*a* in the overlapping portion D11 or D12 (standard imaging result of present modification), the second imaging sensor 2512*a* is calibrated. According to the comparison of the imaging result by the first imaging sensor 2511*a* and the second imaging sensor 2512*a* of the overlapping portion D11, the calibration of the first imaging sensor 2511*a* with relation to the second imaging sensor 2512*a* in which the calibration result is obtained is performed. According to the comparison of the imaging result by the second imaging sensor 2512*a* and the third imaging sensor 2513 of the overlapping portion D12, the calibration of the third imaging sensor 2513*a* with relation to the second imaging sensor 2512*a* in which the calibration result is obtained is performed.

Figure 10:
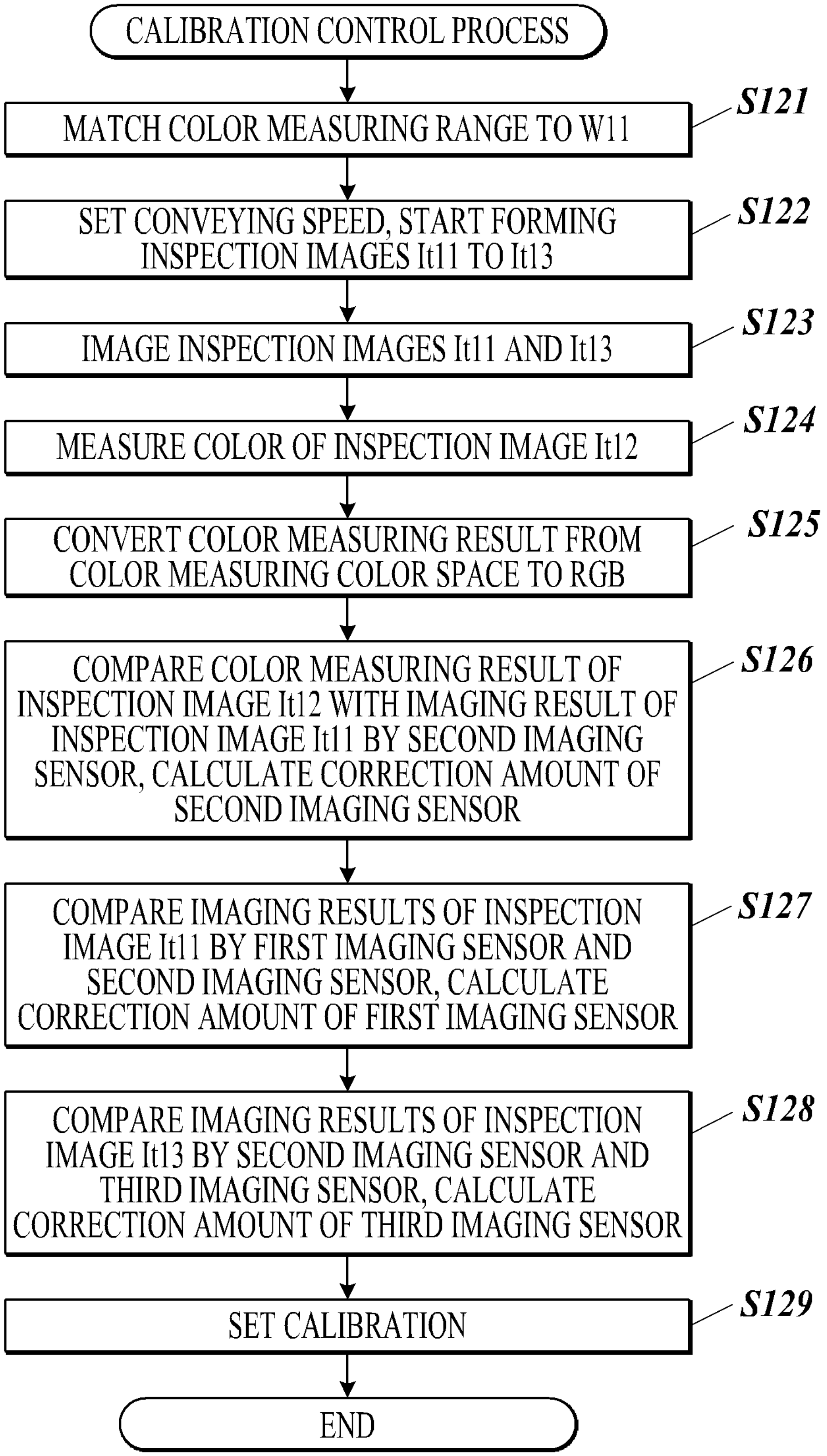
FIG. 10 is a flowchart showing a control procedure of the calibration control process in modification 2.

FIG. 10 is a flowchart showing a control procedure of the calibration control process according to modification 2.

When the calibration control process starts, the controller 40 matches the color measuring range to the range W11 (step S121). When the measurer 26 is fixed as described above, this process is not necessary.

The controller 40 sets the conveying speed of the medium M by the medium conveyor 71 and starts the conveying operation. The controller 40 forms the inspection images It11 to It13 on the conveyed medium M in the positions with the above relation (step S122). The controller 40 controls the imager 25 to image the inspection images It11 and It13 at the timing that the inspection images It11 to It13 reach the imaging range of the imager 25 (step S123). The controller 40 controls the color measurer 26 to perform color measurement of the range W11 (step S124).

The controller 40 converts the color measuring result of the inspection image It12 by the color measurer 26 to the RGB brightness value (step S125). The controller 40 compares the color measuring result of the inspection image It12 with the imaging result of the inspection image It11 by the second imaging sensor 2512*a* (may also be inspection image It13), and the correction amount regarding reading of the second imaging sensor 2512*a* is calculated (step S126).

The controller 40 compares the imaging result of the inspection image It11 by the first imaging sensor 2511*a* with that by the second imaging sensor 2512*a*, and calculates the correction value for the first imaging sensor 2511*a* using the imaging result by the second imaging sensor 2512*a* as the standard (step S127). The controller 40 compares the imaging result of the inspection image It13 by the second imaging sensor 2512*a* with that by the third imaging sensor 2513*a* and calculates the correction value of the third imaging sensor 2513*a* using the imaging result by the second imaging sensor 2512*a* as the standard (step S128).

The controller 40 performs the setting of the calibration amount of imaging sensors 251*a* (step S129). The controller 40 ends the calibration control process.

Modification 3

Figure 11:
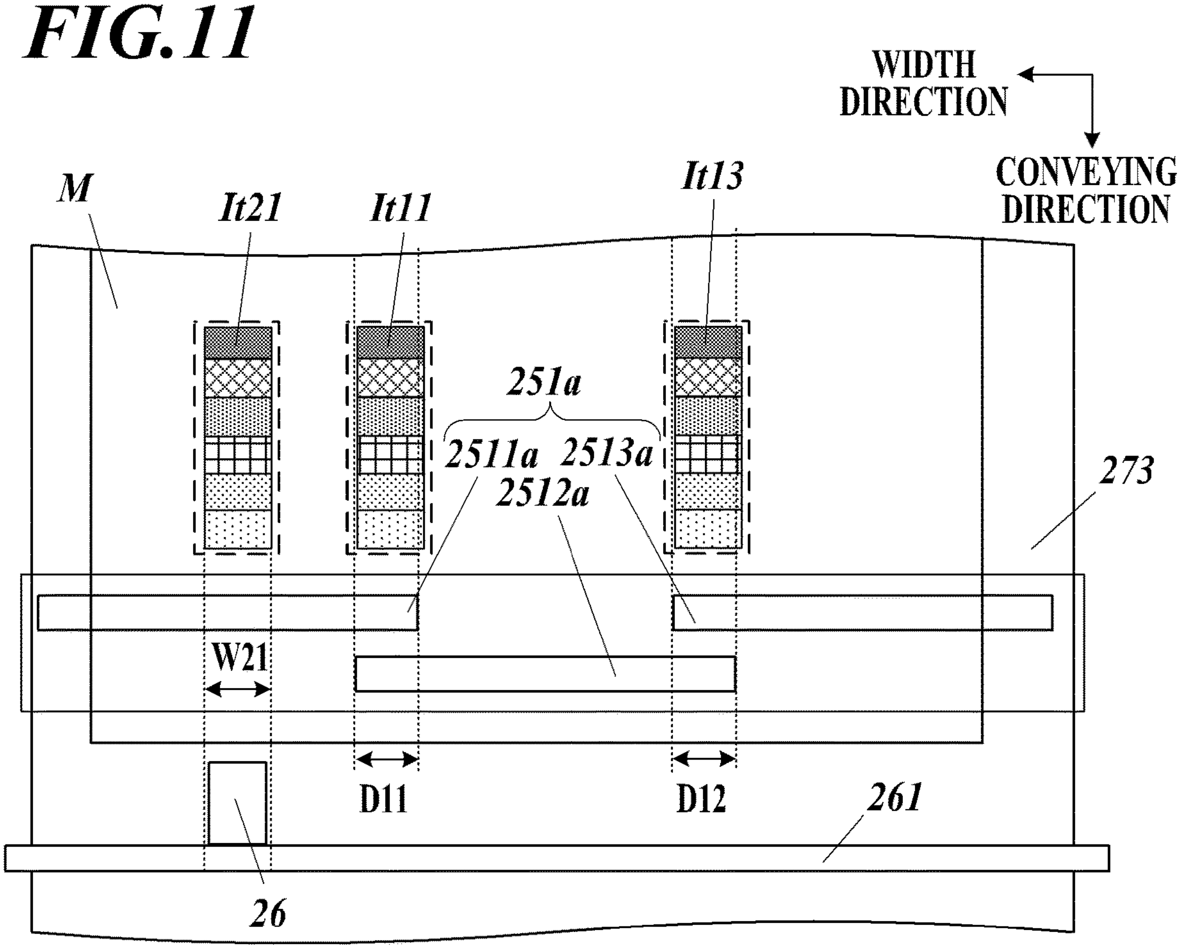
FIG. 11 is a diagram showing a modification 3 of the calibration operation.

FIG. 11 is a diagram showing a modification 3 of the calibration operation.

According to the modification 3, the relative calibration operation among the imaging sensors is performed by multi stage series. When the range W21 where the color measurer 26 performs color measurement is the imaging range of the first imaging sensor 2511*a* (first sensor of the present modification) which is the edge of the imager 25, the calibration of the second imaging sensor 2512*a* (second sensor of the present modification) is performed by comparison with the first imaging sensor 2511*a* in the overlapping portion D11. Further, the calibration of the third imaging sensor 2513*a* (third sensor of the present modification) is performed by comparison of the overlapping portion D12 (second overlapping portion) between the second imaging sensor 2512*a* and the third imaging sensor 2513*a*. Together with the above, other than the inspection images It11 and It13, the inspection image It21 is formed in the range W21 instead of the inspection image It12.

That is, the calibration of the third imaging sensor 2513*a* is performed indirectly based on the comparison between the measuring result of the measurer 26 and the imaging result of the second imaging sensor 2512*a* which is not directly compared with the measuring result of the measurer 26 and the calibration degree of the second imaging sensor 2512. Instead of up to the third imaging sensor 2513*a*, such calibration operation can be performed further with a few more stages. Normally, the accuracy decreases as the number of stages increases, and the number of maximum stages may be suitably set.

Figure 12:
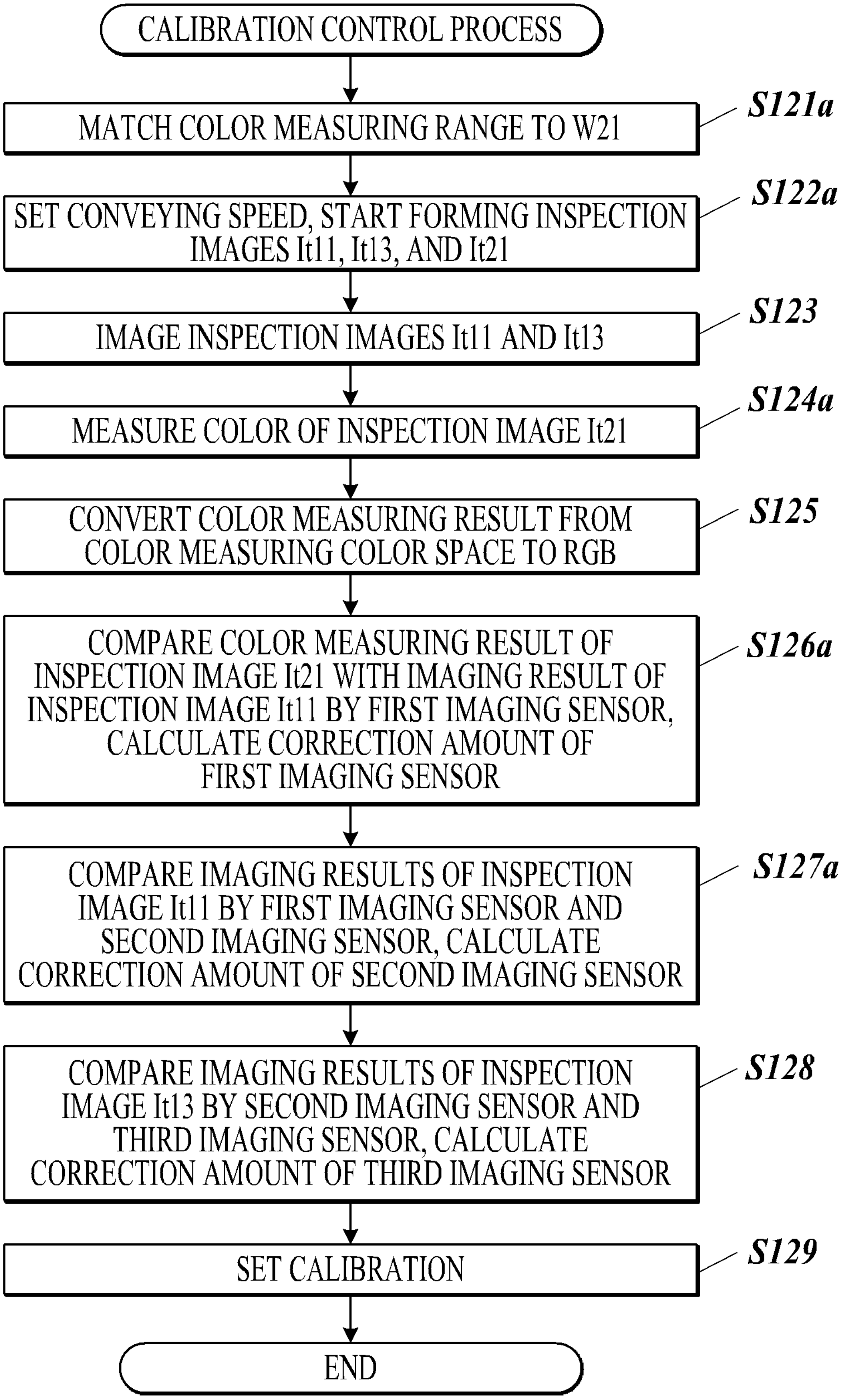
FIG. 12 is a flowchart showing a control procedure of the calibration control process in modification 3.

FIG. 12 is a flowchart showing a control procedure of the calibration control process according to modification 3. According to this calibration control process, among the processes in the calibration control process of modification 2, steps S121 to S124, S126, and S127 are exchanged with steps S121*a*, S122*a*, S124*a*, S126*a*, and S127*a*. The other processes are the same, and the same reference numerals are applied to the same processing contents.

When the calibration control process starts, the controller 40 matches the color measuring range of the color measurer 26 to the range W21 (step S121*a*). Similar to the above modification 2, such process is not necessary when the color measurer 26 is fixed.

The controller 40 sets the conveying speed of the medium M by the medium conveyor 71 and starts the conveying operation. Moreover, the controller 40 forms the inspection images It11, It13, and It21 on the conveyed medium M in the positions with the above relation (step S122*a*). The controller 40 controls the imager 25 to image the inspection images It11 and It13 at the timing that the inspection images It11 and It13 reach the imaging range of the imager 25 (step S123). The controller 40 controls the color measurer 26 to perform the color measurement in the range W21 (step S124*a*).

The controller 40 converts the color measuring result of the inspection image It12 by the color measurer 26 to the RGB brightness value (step S125). The controller 40 compares the color measuring result of the inspection image It21 with the imaging result of the inspection image It11 by the first imaging sensor 2511*a*, and calculates the correction amount regarding reading of the first imaging sensor 2511*a* (step S126*a*).

The controller 40 compares the imaging results of the inspection image It11 by the first imaging sensor 2511*a* and the second imaging sensor 2512*a*, and calculates the correction value of the second imaging sensor 2512*a* using the imaging result of the first imaging sensor 2511*a* as the standard (step S127*a*). The controller 40 compares the imaging result of the inspection image It13 between the second imaging sensor 2512*a* and the third imaging sensor 2513*a* and the correction value of the third imaging sensor 2513*a* is calculated using the imaging result of the second imaging sensor 2512*a* as the standard (step S128).

The controller 40 performs the setting of the correction amount of the imaging sensors 251*a* (step S129). Then, the controller 40 ends the calibration control process.

As described above, the image forming apparatus 1 according to the above embodiment includes the medium conveyor 71 and the image forming drum 21 which are conveyors which move the medium M on the predetermined conveying path, the imager 25 which includes a plurality of imaging sensors 251 (2511 to 2514) and which images the surface of the medium M on the conveying path, a color measurer 26 which measures the color of the surface of the medium M on the conveying path, and the controller 40. The imaging range by each of the plurality of imaging sensors 2511 to 2514 include the overlapping portions D1 to D3 between adjacent imaging sensors in the width direction orthogonal to the conveying direction along the conveying path (in the plane parallel to the conveying surface). Based on the color measuring result of the inspection image It1 measured within the standard imaging range of the first imaging sensor 2511 among the plurality of imaging sensors 251 and the standard imaging result within the standard imaging range imaging the inspection image It2 with the same pattern, the controller 40 performs calibration operation of the first imaging sensor 2511. The controller 40 compares the imaging result by the plurality of imaging sensors 2512 and 2513 in the overlapping portion D1 and performs the calibration operation of another sensor different from the first imaging sensor 2511 (third imaging sensor 2513), here, the second imaging sensor 2512 (fourth imaging sensor 2514) using the standard imaging result of the first imaging sensor 2511 (third imaging sensor 2513) as the standard.

As described above, some of the imaging sensors 251 are calibrated accurately using the color measurer 26 while adjustment among other imaging sensors 251 is performed relatively by the comparison of the imaging results of the inspection images It2 and It4 using the overlapping portion of the imaging range of the imaging sensor 251. Therefore, it is possible to achieve more accuracy, and the burden and the time for adjustment can be decreased. With this, the calibration of the imaging sensors 251 in the image forming apparatus 1 can be performed more easily and accurately.

The color measuring range by the color measurer 26 is the portion other than the overlapping portion in the standard imaging range of the first imaging sensor 2511 (third imaging sensor 2513). That is, in the calibration operation, the color measurement and the imaging can be performed in different positions.

The other sensors include the second imaging sensor 2512 including the overlapping portion D1 between the first imaging sensor 2511. Based on the difference of the imaging results in the overlapping portion D1 between the second imaging sensor 2512 and the first imaging sensor 2511, the controller 40 determines the calibration degree of the second imaging sensor 2512 with relation to the first imaging sensor 2511 in which the calibration operation is performed. As described above, the calibration of the second imaging sensor 2512 including the overlapping portion D1 overlapping with the first imaging sensor 2511 in which accurate calibration is performed is performed by comparison of the imaging result of the same inspection image It2 in the overlapping portion D1. Therefore, compared to performing the color measurement separately, the time and the burden can be decreased and the calibration of the plurality of imaging sensors 251 can be performed more accurately than the conventional methods.

As shown in the modification 3, the other sensors may include the third imaging sensor 2513*a* including the overlapping portion D12 with the second imaging sensor 2512*a*. Based on the difference between the imaging results obtained in the overlapping portion D12 by the second imaging sensor 2512*a* and the third imaging sensor 2513*a*, and the calibration degree of the second imaging sensor 2512*a* based on the comparison with the first imaging sensor 2511*a*, the controller 40 determines the calibration degree of the third imaging sensor 2513*a*.

As described above, the comparison between the imaging sensors 251*a* using the overlapping portions can be a plurality of stages. With this, it is possible to perform calibration of the absolute value for three or more imaging sensors 251*a* based on one color measuring result. Therefore, it is possible to perform calibration which is more efficient and more accurate in the image forming apparatus 1.

As shown in modification 2, the other sensors may include the third imaging sensor 2513*a* including an overlapping portion D12 different from the overlapping portion D11 which is the overlapping portion between the second imaging sensor 2512*a* and the first imaging sensor 2511*a* in which the comparison calibration is performed in advance with the second imaging sensor 2512*a* used as the standard. Based on the difference of the imaging result of the overlapping portion D12 by the second imaging sensor 2512*a* and the third imaging sensor 2513*a*, the controller 40 determines the calibration degree of the third imaging sensor 2513*a* with relation to the second imaging sensor 2512*a* in which the calibration operation is performed. That is, the second imaging sensor 2512*a* including the overlapping portions in both ends is used as the standard. Based on one color measuring result of the second imaging sensor 2512*a*, calibration of the first imaging sensor 2511*a* and the third imaging sensor 2513*a* can be performed accurately using the overlapping portions D11 and D12 at both ends. Therefore, the calibration which is more efficient and more accurate can be performed. When there are three imaging sensors, the color measurement can be performed near the center of the imaging width. Therefore, the color measurement can be performed stably and accurately compared to near the edges.

Moreover, a plurality of the imaging sensors as the standard can be included, for example, two imaging sensors which are the first imaging sensor 2511 and the third imaging sensor 2513. Color measurement is performed by the color measurer 26 for each of such imaging sensors 2511 and 2513. The controller 40 performs the calibration operation on other sensors in the range determined for each of the imaging sensors 2511 and 2513.

When the number of imaging sensors 251 is three or four or more, and it is difficult to perform the process by the comparison with one color measuring result, a plurality of imaging sensors can be selected as the color measurement target. With this, the sufficient calibration accuracy can be obtained without largely reducing the efficiency of the calibration operation.

The image forming apparatus 1 includes the color measurer mover 72 which moves the color measurer 26 in the width direction. The controller 40 controls the color measurement so that the color is measured in the color measuring positions determined corresponding to each of the plurality of imaging sensors (first imaging sensor 2511 and third imaging sensor 2513) as the standard. As described above, by moving the color measurer 26 which is hardly used, the calibration can be performed efficiently and accurately when the color measurement is necessary in a plurality of positions at the time of calibration.

The image forming apparatus 1 includes the head unit 23 which forms the image on the surface of the medium M on the conveying path. Based on the moving speed of the medium M by the conveyor and the moving speed of the color measurer 26 by the color measurer mover 72, the controller 40 sets the positions of the inspection images formed in a plurality of color measuring positions to be in different positions in the direction along the conveying path.

As described above, when the color measurer 26 is moved and the color measurement is performed in the different positions, the color measurement cannot be performed in the different positions at the same time while conveying the medium M. Therefore, by suitably forming inspection images with the position shifted according to the moving time of the color measurer 26, the calibration operation can be performed efficiently and accurately without burden in the flow of the conveying of the medium M.

The controller 40 is capable of changing the moving speed of the medium M by the conveyor, and determines the moving speed of the medium M based on the moving speed of the color measurer 26 by the color measurer mover 72 and the relation of the positions of the plurality of inspection images formed on the medium M by the head unit 23. Therefore, when there is a limit in the position of the inspection image due to the size of the medium M or when the user desires to make the length in which the inspection image is formed on the medium M to be shorter, the moving speed is changed, specifically, reduced. With this, suitable adjustment of the calibration operation can be performed easily according to the positioning of the inspection images.

According to modification 1, when the calibration operation is performed, the controller 40 may control the conveyor to move the medium M so that the medium M passes a plurality of times the position in the conveying direction where the color is measured by the color measurer 26. That is, the conveyor may continue rotating the conveying drum or send the medium M backwards. With this, when the calibration operation is performed while the medium M is conveyed, there is no need to shift the positions of the inspection images It1 to It4, and the range that the inspection images It1 to It4 are formed can be saved in the conveying direction of the medium M.

The controller 40 controls the head unit 23 to form a plurality of inspection images It1 to It4 on the medium M. The inspection images can be formed with the image forming apparatus 1 itself, and therefore, the positions of the plurality of inspection images It1 to It4 can be easily adjusted.

The controller 40 is able to change the moving speed of the medium by the conveyor. Therefore, when the calibration is performed, it is possible to flexibly handle the process, for example, to perform the process at a speed different from the normal image forming operation.

The inspection image It1 in which the color is measured within the standard imaging range of the first imaging sensor 2511 and the inspection image It2 regarding the obtaining of the standard imaging result are in the same position in the conveying direction of the medium M. Therefore, the inspection images It1 and It2 which are targets of comparison are not influenced by the difference in the gradation of recording due to variation in the conveying, and the images can be compared with high accuracy even if the images are separate images.

The image reading apparatus including the configuration of the above-described image forming apparatus 1 other than the head unit 23 includes the color measurer 26 and the calibration operation is performed by an in-line process using the color measurer. With this, the reading sensitivity of the imager 25 can be adjusted accurately without a burden.

The calibration method of the imaging sensor 251 according to the present embodiment includes the first calibration step which performs the calibration operation of the first imaging sensor 2511 based on the color measuring result by the color measurer 26 measuring the predetermined inspection image It1 in the standard imaging range of the first imaging sensor 2511 which is to be the standard among the plurality of imaging sensors 251, and the standard imaging result of the inspection image It2 imaged in the standard imaging range with the same pattern as the inspection image It1, and the second calibration step which performs the calibration operation of the second imaging sensor 2512, etc. different from the first imaging sensor 2511 using the standard imaging result as the standard by comparing the imaging results by the plurality of imaging sensors 251 in the overlapping portions D1 and D3.

As described above, the calibration of the imaging sensors 251 is performed by comparing the color measuring result in-line by the color measurer 26 provided in the image forming apparatus 1 with the imaging result. Therefore, it is possible to omit the burden of matching the positions and communicating data. With this, the calibration of the imaging sensor 251 can be easily performed. Specifically, the color measurement is performed on only some of the plurality of imaging sensors 251, and the rest are adjusted by comparison of the imaging results by the plurality of imaging sensors in the overlapping portions D1 and D2. Therefore, the calibration of the plurality of imaging sensors 251 can be performed within a short time efficiently and accurately.

The present invention is not limited to the above, and various changes are possible.

For example, the plurality of imaging sensors 251 are positioned in a hound's tooth shape in the embodiments described above, but the arrangement is not limited to the above, and any arrangement is possible if the arrangement includes an overlapping portion in the width direction.

According to the present embodiment, the imaging sensor is described as the line sensor, but the sensor can be a two-dimensional sensor which is capable of imaging collectively at a predetermined width in the conveying direction. The color measurer 26 is not limited to include one colorimeter, and a colorimeter can be provided for each of the plurality of overlapping portions.

According to the present embodiment, the moving speed V2 driven by the color measurer mover 72 is a constant speed, but the speed may gradually increase at the start of movement and gradually decrease at the end of the movement. The conveying speed V1 of the medium M conveyed by the medium conveyor 71 does not have to be variable. Here, variable means the medium M can be conveyed by selecting one speed from a plurality of speeds. The speed changing during the conveying such as the speed increasing or decreasing at the start of conveying or the end of conveying is not considered here.

According to the present embodiment, the ranges W1 and W3 are determined to be near the center of the imaging range by the imaging sensors 251, but the setting is not limited to the above, and the ranges can be suitably determined. For example, the ranges can be overlapped with the overlapping portions D1 and D3. In this case, the inspection images It1 and It3 according to the present embodiment can also be used as the inspection images It2 and It4, respectively.

The width of the inspection images It1 to It4 can be suitably adjusted independently. The inspection images It2 and It4 may be formed according to the width of the overlapping portions D1 and D3, and the inspection images It1 and It3 may be formed according to the width in which the color measurer 26 is capable of measuring the color.

According to the above modification, the medium M is conveyed backwards and the second and after color measurement is performed while the medium M is conveyed forward again. Alternatively, the color measurement can be performed while the medium M is conveyed backwards. Specifically, when the color measurement is performed three or more times, the color measurement can be performed both going and coming back. With this, it is possible to reduce the number of times the medium M is conveyed back and forth.

The inspection images It1 to It4 are not limited to those formed by the image forming apparatus 1. If the positioning with the overlapping portions D1 and D3, the color measuring ranges W1 and W3, or the like can be suitably performed, the inspection images It1 to It4 on the inspection sheet prepared in advance can be imaged and the color can be measured. Alternatively, the inspection sheet in which the inspection images were formed before can be used repeatedly a plurality of number of times.

The image forming according to the above embodiment is not limited to flat images formed by colored ink. Black and white ink or transparent (optically transparent) ink can be included, and the structure may be three dimensional. The medium M does not have to be conveyed by the cylinder shaped image forming drum 21, and a belt member which conveys the medium M along a plane can be used.

According to the above embodiment, the calibration is performed collectively after all of the calibration degrees are determined. However, the calibration can be performed at any time in the order that the calibration degree is determined. The comparison of the images imaged by the imaging sensor can performed by first performing one calibration and then comparing the calibrated imaged image with the imaged image before calibration.

According to the above embodiment, the inspection image It1 (It3) for color measurement and the inspection image It2 (It4) for imaging are formed in the same position in the conveying direction, but the position is not limited to the above. When it is not necessary to consider variation in the density in the conveying direction due to variation in the conveying, the inspection images can be formed in different positions in the conveying direction. Moreover, if the inspection images are the same pattern (combination of each color in a small region), the order of the colors of the small regions may be different. The number of small regions can be suitably adjusted according to necessity. The shape of the small region is not limited to a rectangle. The shape can be any shape if the small region can be read with the necessary accuracy. The read result can be a representative value such as an average value of a plurality of points in the small region.

In the above embodiment, the image forming apparatus including the line head is described but the above disclosure can be applied to the calibration in the type which forms the image while scanning the medium M with the head unit 23 if the plurality of imaging sensors are connected to be a long imager 25.

According to the above embodiment, the inkjet type image forming apparatus is provided as the example (inkjet recording apparatus) but other types of image forming apparatuses such as a electrophotography type can be used. The method of ejecting ink may be any type such as a piezo type using piezoelectric elements or a thermal type using a heating element.

The configuration and the operation performed in the processes as shown in the embodiments and modifications 1 to 3 can be combined or omitted freely as long as there is no contradiction or the features of the present invention are not eliminated or offset.

The specific configuration, contents of the processes and the procedures described in the above embodiments can be suitably changed without leaving the scope of the present invention. The scope of the present invention includes the scope of the invention as described in the claims and its equivalents.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image reading apparatus comprising:

a conveyor that moves a medium on a predetermined conveying path;

a first image sensor that images a surface of the medium on the conveying path;

a second image sensor that images the surface of the medium on the conveying path, wherein a portion of the first image sensor and a portion of the second image sensor overlap in a first overlapping portion in a width direction orthogonal to a conveying direction along the conveying path; and a color measurer that is capable of moving in the width direction back and forth along a supporter, and measures a color of the surface of the medium on the conveying path at a downstream side of the first overlapping portion, wherein the supporter is longer in the width direction than a combined imaging range of the first image sensor and the second image sensor.

2. The image reading apparatus according to claim 1, wherein the color measurer measures the color in a plurality of positions in the width direction.

3. The image reading apparatus according to claim 1, wherein the color measurer is capable of moving in the width direction throughout a portion of the first image sensor that does not overlap with the second image sensor, the first overlapping and a portion of the second image sensor that does not overlap with the first image sensor.

4. The image reading apparatus according to claim 1, wherein the color measurer is fixed when the color is measured.

5. The image reading apparatus according to claim 1, wherein the color measurer is positioned toward a downstream side of a conveying direction by the conveyor than the first image sensor and the second image sensor.

6. The image reading apparatus according to claim 1, further comprising:

a third image sensor that images a surface of the medium on the conveying path, wherein, a portion of the second image sensor and a portion of the third image sensor overlap in a second overlapping portion in the width direction orthogonal to the conveying direction along the conveying path, and the first overlapping portion and the second overlapping portion are in different positions in the width direction, the supporter being longer in the width direction than a further combined imaging range of the first image sensor, the second image sensor, and the third image sensor; and a hardware processor configured to move the color measurer in a width direction to measure a first inspection image corresponding to a portion of the first image sensor that does not overlap with the second image sensor in the width direction and a third inspection image corresponding to a portion of the third image sensor that does not overlap with the second image sensor in the width direction.

7. An image forming apparatus comprising:

an image former that forms an image on a surface of a medium; and an image reading apparatus that read the image on the medium, the image reading apparatus including:

a conveyor that moves the medium on a predetermined conveying path;

a first image sensor that images a surface of the medium on the conveying path;

a second image sensor that images the surface of the medium on the conveying path, wherein a portion of the first image sensor and a portion of the second image sensor overlap in a first overlapping portion in a width direction orthogonal to a conveying direction along the conveying path; and a color measurer that is capable of moving in the width direction back and forth along a supporter, and measures a color of the surface of the medium on the conveying path at a downstream side of the first overlapping portion, wherein the supporter is longer in the width direction than a combined imaging range of the first image sensor and the second image sensor.

8. The image reading apparatus according to claim 7, wherein the color measurer measures the color in a plurality of positions in the width direction.

9. The image reading apparatus according to claim 7, wherein the color measurer is capable of moving in the width direction throughout a portion of the first image sensor that does not overlap with the second image sensor, the first overlapping and a portion of the second image sensor that does not overlap with the first image sensor.

10. The image reading apparatus according to claim 7, wherein the color measurer is fixed when the color is measured.

11. The image reading apparatus according to claim 7, wherein the color measurer is positioned toward a downstream side of a conveying direction by the conveyor than the first image sensor and the second image sensor.

* * * * *